(12) United States Patent
Peacock et al.

(10) Patent No.: US 10,606,665 B2
(45) Date of Patent: *Mar. 31, 2020

(54) JOB SCHEDULING AND MONITORING IN A DISTRIBUTED COMPUTING ENVIRONMENT

(71) Applicant: Microsoft Technology Licensing, LLC, Redmond, WA (US)

(72) Inventors: Andrew J. Peacock, Seattle, WA (US); Cheryl Couris, Seattle, WA (US); Christina Storm, Seattle, WA (US); Amir Netz, Bellevue, WA (US); Chiu Ying Cheung, Redmond, WA (US); Michael J. Flasko, Kirkland, WA (US); Kevin Grealish, Seattle, WA (US); Giovanni M. Della-Libera, Redmond, WA (US); Sonia P. Carlson, Redmond, WA (US); Mark W. Heninger, Preston, WA (US); Paula M. Bach, Redmond, WA (US); David J. Nettleton, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/596,709

(22) Filed: May 16, 2017

(65) Prior Publication Data
US 2017/0286185 A1 Oct. 5, 2017

Related U.S. Application Data

(63) Continuation of application No. 14/572,745, filed on Dec. 16, 2014, now Pat. No. 9,684,546.

(51) Int. Cl.
*G06F 9/46* (2006.01)
*G06F 9/52* (2006.01)
(Continued)

(52) U.S. Cl.
CPC .............. *G06F 9/52* (2013.01); *G06F 3/0482* (2013.01); *G06F 3/04842* (2013.01); *G06Q 10/06311* (2013.01)

(58) Field of Classification Search
CPC .................................. G06F 9/52; G06F 9/5061
(Continued)

(56) References Cited

U.S. PATENT DOCUMENTS 5,057,996 A * 10/1991 Cutler ...................... G06F 9/52
718/106
5,095,369 A * 3/1992 Ortiz ...................... G03G 15/50
358/296
(Continued)

FOREIGN PATENT DOCUMENTS

JP          H1196024 A      4/1999
JP         2006243996 A     9/2006
(Continued)

OTHER PUBLICATIONS

Zhang et al, "Dynamic Slicing Long Running Programs through Execution Fast Forwarding", ACM, pp. 81-91, 2006.*
(Continued)

*Primary Examiner* — Anil Khatri
(74) *Attorney, Agent, or Firm* — Davin Chin; Chin IP, PLLC

(57) ABSTRACT

Job execution can be scheduled and monitored. Execution of a job results in generation of one or more data slices, which can be consumed as input by one or more related jobs. Data slices can be presented in an interactive view. Selection of a data slice in the view can trigger automatic identification of related data slices based on dependencies between data slices. Each data slice can also include and be presented with a status indicating the availability of corresponding data, such as pending, ready, or failed. Furthermore, selection of a data slice that failed to generate successfully can trigger identification of related data slices that failed or are predicted to fail to generate successfully.

20 Claims, 18 Drawing Sheets

(51) Int. Cl.
  *G06F 3/0482* (2013.01)
  *G06F 3/0484* (2013.01)
  *G06Q 10/06* (2012.01)
(58) Field of Classification Search
  USPC .......................................... 718/1, 100–108
  See application file for complete search history.

(56) References Cited

U.S. PATENT DOCUMENTS

| | | | |
|---|---|---|---|
| 5,101,340 A | 3/1992 | Nonaka et al. | |
| 5,490,272 A * | 2/1996 | Mathis | G06F 9/3009 |
| | | | 710/264 |
| 5,563,994 A | 10/1996 | Harmon et al. | |
| 5,581,778 A * | 12/1996 | Chin | G06F 9/3885 |
| | | | 712/16 |
| 5,978,831 A * | 11/1999 | Ahamed | G06F 9/52 |
| | | | 712/30 |
| 6,195,676 B1 | 2/2001 | Spix et al. | |
| 6,269,390 B1 * | 7/2001 | Boland | G06F 9/4881 |
| | | | 711/120 |
| 6,757,897 B1 * | 6/2004 | Shi | G06F 9/4843 |
| | | | 710/240 |
| 6,792,601 B1 * | 9/2004 | Dimpsey | G06F 9/52 |
| | | | 718/102 |
| 6,952,827 B1 * | 10/2005 | Alverson | G06F 9/461 |
| | | | 709/203 |
| 6,993,764 B2 * | 1/2006 | Petrini | G06F 9/5066 |
| | | | 712/10 |
| 7,086,063 B1 | 8/2006 | Ousterhout et al. | |
| 7,140,019 B2 * | 11/2006 | May | G06F 8/445 |
| | | | 718/102 |
| 7,234,139 B1 * | 6/2007 | Feinberg | G06F 9/45504 |
| | | | 718/1 |
| 7,330,822 B1 | 2/2008 | Robson et al. | |
| 7,424,712 B1 * | 9/2008 | Sistare | G06F 9/485 |
| | | | 718/102 |
| 7,503,048 B1 * | 3/2009 | Sheets | G06F 9/52 |
| | | | 712/1 |
| 7,516,458 B2 | 4/2009 | Klotzek et al. | |
| 7,661,015 B2 | 2/2010 | Revanuru et al. | |
| 7,694,302 B1 * | 4/2010 | Rajan | G06F 9/5061 |
| | | | 718/102 |
| 7,784,056 B2 | 8/2010 | Youngblood et al. | |
| 7,861,246 B2 | 12/2010 | Lu et al. | |
| 7,877,355 B2 * | 1/2011 | Borgsmidt | G06F 17/30592 |
| | | | 707/616 |
| 8,024,369 B2 | 9/2011 | Pellegrini et al. | |
| 8,056,083 B2 * | 11/2011 | Jensen | G06F 9/4881 |
| | | | 718/104 |
| 8,082,293 B1 * | 12/2011 | Doyle | G06F 9/5027 |
| | | | 345/419 |
| 8,108,844 B2 | 1/2012 | Crutchfield et al. | |
| 8,150,889 B1 | 4/2012 | Bacthavachalu et al. | |
| 8,181,176 B2 * | 5/2012 | Zhou | G06F 9/45558 |
| | | | 710/5 |
| 8,205,205 B2 | 6/2012 | Franke | |
| 8,261,277 B2 | 9/2012 | Narayanan et al. | |
| 8,276,012 B2 * | 9/2012 | Hanson | G06F 9/5061 |
| | | | 713/320 |
| 8,302,097 B2 | 10/2012 | Buco et al. | |
| 8,312,037 B1 | 11/2012 | Bacthavachalu et al. | |
| 8,347,207 B2 * | 1/2013 | Borgsmidt | G06F 16/283 |
| | | | 715/231 |
| 8,387,041 B2 * | 2/2013 | Branda | G06F 9/5077 |
| | | | 718/1 |
| 8,407,706 B2 | 3/2013 | Gerwens et al. | |
| 8,418,179 B2 | 4/2013 | Papakipos et al. | |
| 8,601,484 B2 * | 12/2013 | Salsbery | G06F 11/3013 |
| | | | 709/223 |
| 8,612,989 B1 * | 12/2013 | Richards | G06F 9/5027 |
| | | | 718/105 |
| 8,719,067 B2 | 5/2014 | Fama et al. | |
| 8,719,825 B2 | 5/2014 | Rajput | |
| 8,739,175 B2 * | 5/2014 | Donahue | G06F 8/63 |
| | | | 709/223 |
| 8,839,254 B2 * | 9/2014 | Horvitz | G06F 9/4893 |
| | | | 718/102 |
| 8,978,034 B1 | 3/2015 | Soules et al. | |
| 9,021,430 B2 * | 4/2015 | Park | G06F 8/36 |
| | | | 717/120 |
| 9,021,488 B2 * | 4/2015 | Kim | G06Q 10/06 |
| | | | 718/104 |
| 9,032,406 B2 | 5/2015 | Eberlein | |
| 9,043,796 B2 * | 5/2015 | Tillier | G06F 9/52 |
| | | | 718/102 |
| 9,465,653 B2 | 10/2016 | Kishore et al. | |
| 9,684,546 B2 * | 6/2017 | Peacock | G06F 9/52 |
| 10,055,698 B2 * | 8/2018 | Elenbaas | G06Q 10/06311 |
| 2004/0168171 A1 | 8/2004 | Comparato et al. | |
| 2008/0059894 A1 | 3/2008 | Cisler et al. | |
| 2011/0264711 A1 | 10/2011 | Thang et al. | |
| 2011/0271220 A1 | 11/2011 | Remsberg et al. | |
| 2012/0299926 A1 | 11/2012 | Hodes et al. | |
| 2013/0218626 A1 | 8/2013 | Duquette et al. | |
| 2013/0290974 A1 | 10/2013 | Druyan et al. | |
| 2014/0143701 A1 | 5/2014 | Hoyer et al. | |

FOREIGN PATENT DOCUMENTS

| | | | |
|---|---|---|---|
| JP | 2009230584 A | 10/2009 | |
| WO | 2010001555 A1 | 10/2010 | |
| WO | 2013122842 A1 | 8/2013 | |

OTHER PUBLICATIONS

Samuel et al, "Slicing-Based Test Case Generation from UML Activity Diagrams", ACM, pp. 1-14, 2009.*
Mauri et al, "Weaving data, slicing views: a design approach to creating visual access for digital archival collections", ACM, pp. 1-8, 2013 (Year: 2013).*
Abadi et al, "Improving Slice Accuracy by Compression of Data and Control Flow Paths", ACM, pp. 223-232, 2009 (Year: 2009).*
Varchola et al, "Processing of Volumetric Data by Slice- and Process-Based Streaming", ACM, pp. 101-110, 2007 (Year: 2007).*
Wang et al, "Dynamic Slicing on Java Bytecode Traces", ACM Transactions on Programming Languages and Systems, vol. 30, No. 2, Article 10, pp. 1-49, 2008. (Year: 2008).*
Harman et al, "Evolutionary Testing Supported by Slicing and Transformation", IEEE, pp. 1-1 (Year: 2002).*
Ujhelyi et al, "Dynamic Backward Slicing of Model Transformations", IEEE, pp. 1-10 (Year: 2012).*
Jaffar et al, " A Path-Sensitively Sliced Control Flow Graph", ACM, pp. 133-143 (Year: 2014).*
Zhang et al, "Pruning Dynamic Slices With Confidence", ACM, pp. 169-180 (Year: 2006).*
Hoffman et al, "Slicing Droids: Program Slicing for Smali Code", ACM, pp. 1844-1851 (Year: 2013).*
"Control-M Batch Impact Manager Overview", Retrieved from: https://www.youtube.com/watch?v=BLF1S12yx88&+feature=youtu.be, Oct. 19, 2014, 2 Pages.
"Office Action Issued in Russian Patent Application No. 2017120988", dated Apr. 19, 2019, 11 Pages.
Snavely, et al. "Symbiotic Jobscheduling with Priorities for a Simultaneous Multithreading Processor", In Proceedings of the ACM Sigmetrics International Conference on Measurement and Modeling of Computer Systems, May, 2002, 11 Pages.
"Thinkbox Software Previews Deadline 7", Retrieved From: https://web.archive.org/web/20141022233213/http://www.thinkboxsoftware.com/news/2014/8/11/thinkbox-software-previews-deadline-7.html, Aug. 11, 2014, 3 Pages.
"Final Office Action Issued in U.S. Appl. No. 14/572,745", dated Jul. 29, 2016, 10 Pages.
"Non-Final Office Action Issued in U.S. Appl. No. 14/572,745", dated Jan. 6, 2016, 13 Pages.
"Notice of Allowance Issued in U.S. Appl. No. 14/572,745", dated Feb. 16, 2017, 14 Pages.

(56) References Cited

OTHER PUBLICATIONS

"Office Action Issued in European Patent Application No. 15813224. 1", dated May 2, 2018, 9 Pages.

Smith, et al. "An Object-Oriented Job Execution Environment", In Proceedings of ACM/IEEE Conference on Supercomputing, Nov. 4, 2000, 13 Pages.

Cinque, et al. "Scalable Monitoring and Dependable Job Scheduling Support for Multi-domain Grid Infrastructures", In Proceedings of the 31st Annual ACM Symposium on Applied Computing, Apr. 4, 2016, pp. 2015-2020.

Kipersztok, et al. "Monitoring Network Load for Fuzzy Scheduling of Jobs Submitted to Clusters of Workstations", In Proceedings of 3rd International Symposium on Uncertainty Modeling and Analysis and Annual Conference of the North American Fuzzy Information Processing Society, Sep. 17, 1995, pp. 553- 558.

Muthuvelu, et al. "A Dynamic Job Grouping-Based Scheduling for Deploying Applications with Fine-Grained Tasks on Global Grids", In Proceedings of the Australasian Workshop on Grid Computing and e-Research, vol. 44, Jan. 1, 2005, pp. 41-48.

"International Preliminary Report on Patentability Issued in PCT Application No. PCT/US2015/064163", dated Aug. 11, 2016, 9 Pages.

"International Search Report & Written Opinion Issued in PCT Application No. PCT/US2015/064163", dated Jan. 29, 2016, 12 Pages.

"Second Written Opinion Issued in PCT Application No. PCT/US2015/064163", dated May 25, 2016, 5 Pages.

Rajkumar, et al. "Hybrid Approach for Monitoring and Scheduling the Job in Heterogeneous System", In Proceedings of International Conference on Information Communication and Embedded Systems, Feb. 27, 2014, 5 Pages.

Sathyan, et al. "Job Management in Mobile Grid Computing", In Proceedings of the 7th International Conference on Advances in Mobile Computing and Multimedia, Dec. 14, 2009, pp. 422-426.

Shrinivasan, et al. "Supporting the Analytical Reasoning Process in Information Visualization", In Proceedings of the SIGCHI Conference on Human Factors in Computing Systems, Apr. 5, 2008, pp. 1237-1246.

"Summon to Attend Oral Proceedings Issued in European Patent Application No. 15813224.1", Mailed Date: Aug. 22, 2019, 10 Pages.

"Office Action Issued in Japanese Patent Application No. 2017532738", dated Nov. 21, 2019, 7 Pages.

\* cited by examiner

JOB SCHEDULING AND MONITORING IN A DISTRIBUTED COMPUTING ENVIRONMENT

CROSS-REFERENCE TO RELATED APPLICATION

This application is a continuation of U.S. application Ser. No. 14/572,745 filed Dec. 16, 2014, the entirety of which is incorporated herein by reference.

BACKGROUND

Processing of vast quantities of data, or so-called big data, to glean valuable insight involves first transforming data. Data is transformed into a useable form for publication or consumption by business intelligence endpoints, such as a dashboard, by creating, scheduling, and executing of one or more jobs. In this context, a job is a unit of work over data comprising one or more transformation operations. Typically, jobs are manually coded by data developers, data architects, business intelligence architects, or the like. Subsequently, jobs can be scheduled and executed.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to job scheduling and monitoring. Jobs can be scheduled for execution, and a visualization produced that allows users to view and interact with job schedules and execution as well as data slices generated by jobs. In accordance with one aspect, in response to selection of a data slice, one or more related data slices can be determined automatically based on data dependencies. Subsequently, the data slice as well as related data slices can be highlighted. Execution status of a data slice can also be determined and presented such that successful and failed generation of data slices can be differentiated. Furthermore, in response to selection of failed data slice generation, one or more related failed data slices or data slices predicted to fail can be identified. The selected failed data slice and related data slice generation failures or data slices predicted to fail to be generated successfully can subsequently be highlighted.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Details below generally pertain to job scheduling and monitoring. A job corresponds to at least one data transformation operation. One or more jobs can be presented on a display in an interface, for instance in conjunction with scheduling as well as monitoring execution of the jobs. For example, jobs can be presented on a timeline view indicating when a job is to be executed, when a job was executed, and the length of execution time for the job. A job can be selected, after which related jobs are identified automatically based on data dependencies between jobs and presented to a user. Related jobs can include jobs that depend from the selected job and/or jobs from which the selected job depends. This aids users in efficiently acquiring and interacting with information regarding job scheduling. In addition to data dependency information, execution status can be captured such that jobs that executed or are predicted to execute successfully can be differentiated from jobs that failed or are predicted to fail. Furthermore, a job run that failed can be selected after which related job runs that failed, or are predicted to fail, can be automatically identified based on data dependency, status, and schedule information. Subsequently, the selected failed job run, related failed job runs, or job runs predicted to fail can be highlighted. As result, a convenient way of troubleshooting a scheduling chain is provided. Furthermore, additional views can also exploit at least dependency data. For example, a diagram of jobs or job pipelines can employ dependency information to identify job lineage including jobs and data sets that are utilized by a select job and jobs and data sources that depend on the select job. These and other aspects at least aid users in efficiently scheduling and monitoring job execution as well as reduce errors.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
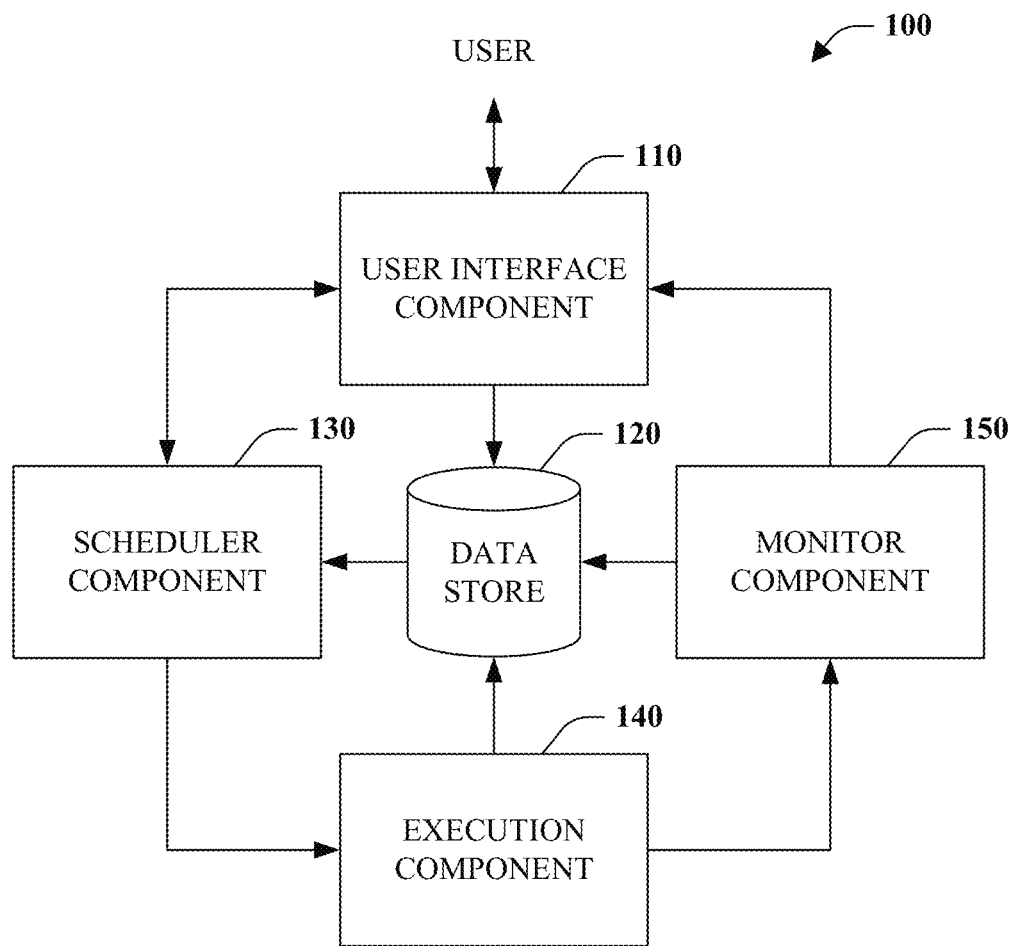
FIG. 1 is a block diagram of a job system.

Referring initially to FIG. 1, a job system 100 is illustrated. The job system 100 provides means for scheduling, execution, and monitoring of jobs comprising a data transformation operation. The job system includes user interface component 110, data store 120, scheduler component 130, execution component 140, and monitor component 150. The user interface component 110 is configured to allow users to view, specify, and control jobs. In one instance, the user interface 110 is configured to provide a mechanism to define a job or job pipeline. As part of this definition, one or more relationships can be specified including one or more data sets on which a job depends and the output data set produced by the job. Jobs including data dependency information can be saved in the data store 120, which is a computer-readable storage medium. The scheduler component 130 is configured to schedule jobs for execution respecting schedules specified with respect to jobs, and relationships between jobs. The schedule can be provided to the user interface for display, and a user can interact with the schedule to acquire particular information and optionally modify the schedule. The scheduler component 130 initiates job processing by the execution component 140. The execution component 140 can comprise a collection of software and hardware resources that enable a job to be executed on a computer. Results of job execution can be stored in the data store 120. Further, the monitor component 150 can monitor job execution by the execution component 140. For example, the monitor component 150 can identify job status such as if execution failed or was successful. Additionally, the monitor component 150 can acquire computational resource utilization with respect to processing jobs. Data or information acquired by the monitor component 150 can be stored in the data store 120 and made available to the user interface component 110 for presentation.

Figure 2:
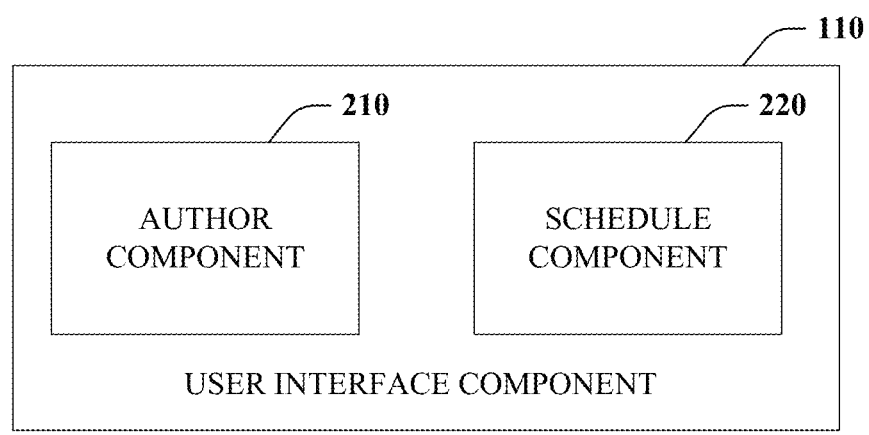
FIG. 2 is a block diagram of a representative user interface component.

FIG. 2 depicts a representative user-interface component 110 in further detail. The user interface component 110 includes author component 210 and schedule component 220. The author component 210 is configure to allow users to specify jobs and pipelines comprising a set of one or more related jobs with output of a first job optionally providing input to second job. In accordance with embodiment, the author component 210 can provide an interactive visual workspace or canvas for diagrammatically authoring jobs and pipelines. For example, a data set can be represented as a cylinder and connected by an arrow to a cube representing a job that consumes the data set and produces a modified data set. Essentially, a user can draw a diagram of relationships between data sets and jobs. This results in an intuitive experience that saves time with respect to understanding relationships and ultimately specifying pipelines. In accordance with other aspects, the author component 210 can be embodied as a code editor that accepts program code or one or more dialog boxes to specify jobs and relationships between jobs. The schedule component 220 is configured to present visualizations regarding scheduling jobs for execution and monitoring execution.

Figure 3:
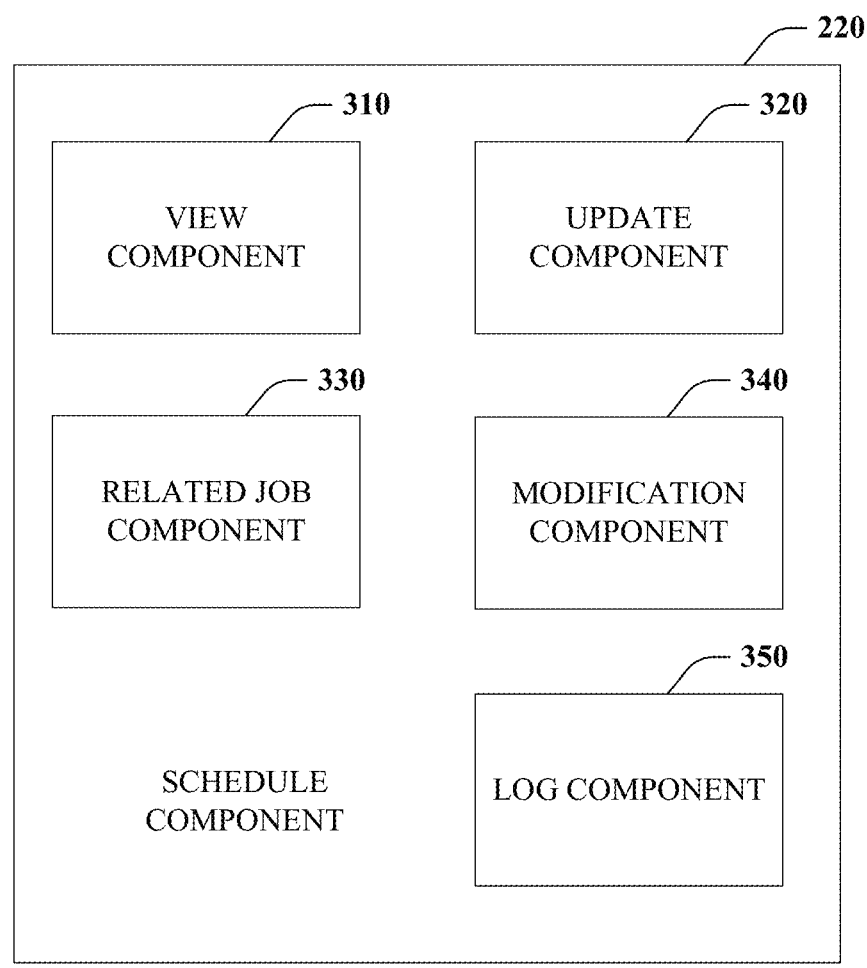
FIG. 3 is a block diagram of a representative schedule component.

Turning attention to FIG. 3, a representative schedule component 220 is illustrated in further detail to facilitate clarity and understanding. The schedule component 220 includes view component 310, update component 320, related job component 330, modification component 340, and log component 350. The view component 310 is configured to present at least one view of jobs scheduled for execution. In accordance with one aspect, the view can correspond to a timeline that visualizes a set of jobs ordered by time of execution including scheduled execution and completed execution. Such a timeline can also enable the length of job execution to be visualized.

The update component 320 is configured to update or bring a visualization produced by the view component 310 up to date with respect to job execution. For instance, the update component 320 can alter the visualization to reflect jobs that have been executed. In one embodiment, the update component 320 can interact with the view component 310 to include a line that represents current time with scheduled but unexecuted jobs colored gray, or grayed out, behind the line. Additionally, the update component 320 can be utilized to identify and distinguish jobs that have executed successfully versus jobs that failed or that can be predicted to fail. For example, successfully executed jobs can be colored green while failures can be signified with the color red.

In accordance with particular embodiment, the view component 310 and update component 320 can cooperate to present a split view comprising a timeline and a visualization of computational resource utilization. In a first portion, a timeline of scheduled jobs can be presented as described above. In a second portion, for instance below the first portion, a visualization such as a graph can be presented that represents the resources utilized aligned with job execution. In this instance, the update component 320 can acquire data regarding resource utilization and job execution and update the graph accordingly.

The related job component 330 is configured to distinguish jobs based on relationships between jobs. Relationships can include jobs and data on which a select job depends or that depend on the select job. In one instance, a selected job can initiate determining jobs related to the selected job and visually distinguishing those related jobs in the visualization provided by the view component 310. By way of example, after receiving a signal selecting a job or representation thereof in a visualization, jobs related to the selected job can be determined based on data dependency and highlighted. Related jobs can be identified from the data store 120 that saves relationships amongst jobs. In accordance with one embodiment, a directed graph can be saved that includes jobs as vertices and data sets as directed edges connecting the jobs. To determine related jobs, the graph can be traversed forward and backward from a vertex that represents the selected job, wherein traversing forward (e.g., downstream from selected job) captures jobs and data sets that depend on the selected job and traversing backward (e.g., upstream from selected job) identifies jobs and data sets from which the selected job depends. Job runs, or instances of jobs, can also be distinguished based on a characteristic or property. For example, if a user selects a job run that has failed to execute successfully, other job runs related to the select job run that have failed, or are predicted to fail, can be identified automatically and highlighted in the view. Such job runs can be identified based on information regarding data dependency between jobs, a status associated with a job (e.g., failed, succeeded . . . ), and execution schedule. Here, a job run can be predicted to fail if it depends on a job run that has failed to execute successfully.

The modification component 340 is configured to enable modification of job scheduling. The modification component 340 is configured to work in conjunction with the view component 310 to acquire user input regarding modification of job execution scheduling. For example, modification component 340 can at least initialize rescheduling of a job for execution based on one or more gestures, received as signals, from the user with respect to a presented interactive view. In accordance with one non-limiting example, a user can select an instance of a job that failed to execute successfully and or perform some additional gesture, such as a right click or drag-and-drop, to reschedule execution.

The log component 350 is configured to enable acquisition and display of execution logs. In accordance with one embodiment, the log component 350 can provide a search mechanism by way of an overlaid search pane or panel. In this scenario, users can specify and submit searches and receive results with respect to execution logs. In accordance with another embodiment, the log component 350 can generate and submit queries automatically based on selection of a particular job run, for instance. In response to a particular gesture associated with log file acquisition, results can be returned that correspond to a selected job run. In this manner, a user can get promptly from notification of a failure, for example, to the point of origin. In an event, making execution logs accessible facilitates troubleshooting such as resolution of failures.

Figure 4:
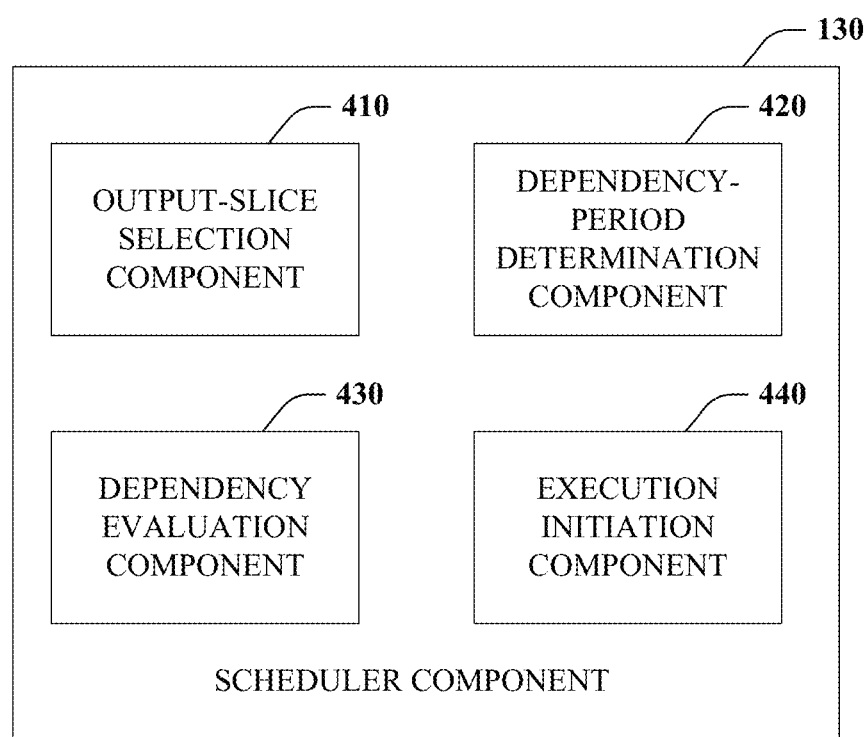
FIG. 4 is a block diagram of a representative scheduler component.

FIG. 4 illustrates a representative scheduler component 130 in accordance with one particular implementation. The scheduler component 130 includes output-slice selection component 410, dependency-period determination component 420 and dependency evaluation component 430, and execution initiation component 440. In this context, a data set is generated or consumed by job or activity capturing a data processing operation, and corresponds to a collection of data on a time axis. In particular, a data set correlates pieces of data, called data slices, to a time period. Stated differently, a data set is composed of a continuum of data slices. Each data slice can have a particular slice length as well as a start time and end time.

The output-slice selection component 410 is configured to determine a data slice to generate. The determination is based on status in an activity period as well as an optional policy. Each data slice can have a status indicating the availability of the corresponding data. Status can take on a number of values including "pending execution" meaning the data is yet to be generated, "in progress" denoting that the slice is being produced, "ready" indicating the data is ready for consumption, and "failed execution" signifying one or more attempts to generate the data has failed. The output-slice selection component 410 identifies data slices with a "pending execution" status within an active period specifying a window of time over which a job will generate its outputs. These data slices can be identified by executing a query over data slices filtered by status and active period. Further, the output slice selection component 410 can further order slice execution, or generation of a data slice, based on a policy. Slices with pending execution status can be compared to wall clock time and picked up in some order. For example, a policy can indicate that an oldest slice be generated first or that the newest slice be generated first, for instance based on when the status was set to "pending execution." In the end, the output-slice selection component 410 identifies a single slice, an output slice, to be generated.

The dependency-period determination component 420 is configured to determine a dependency period. A dependency period is a data time range of input data required to generate identified output slice. The dependency period is part of dependency information defined with respect to a job. For example, a job can be specified to operate over three hours of a data from a first source and one hour of data from a second source. Accordingly, if all data sets have an hourly schedule (e.g., slice is one hour) three hours of data from the first source and one hour of data from the second source is required to generate an hour of output slice data.

The dependency evaluation component 430 is configured to determine whether dependencies of the output slice are satisfied. The dependency evaluation component 430 can identify input data slices within the previously determined dependency period. Further, the status of each input slice is acquired and a determination is made as to whether or not the status of each slice is "ready" meaning the slice is ready for consumption (e.g., the slice was successfully generated or made available externally). If the input slices within the dependency period have a "ready" status, dependencies have been satisfied. Otherwise, dependencies have not been satisfied.

Once the dependency conditions have been met, the execution initiation component 440 is configured to initiation execution of a job to produce an output slice. In other words, activity execution is triggered on the execution component 140 and the selected output data slice generation begins. After execution is initiated, the status of the output data slice is changed from "pending execution" to "in progress." If the final output slice is generated successfully, the output status can be set to "ready." This means that a downstream activity that consumes the slice as its input can now use the slice. If execution fails, execution can be retried a number of times based on a predetermine policy. During this time, the status can be set to "retry" signifying a previous failure and execution retry. If execution does not subsequently succeed, the status of the can be set to "failed execution." Furthermore, each execution can be recorded in a run record, which is associated with the output data slice.

To facilitate further clarity and understanding regarding operation of the scheduler component 130 a few exemplary scenarios are described. First, consider a scenario in which a job comprising a data transformation operation has one input and one output. Here, execution is straightforward. As time goes by, data slices with status "pending execution" before the current run time are picked up and generated if the dependency period is ready. Consider next a scenario in which a job operates with respect to one input and multiple outputs. In this case, the union of data slices from all outputs is used as the pool of slices to be generated. The change of status for the output data slice happens on all the output data sets. The rest of execution is no different from the previous case. Next, consider a job with multiple inputs and multiple outputs. The union of data slices from all outputs again is used as the pool of slices to be generated. In order for a "pending execution" output slice to be generated, the dependency period is determined, and if all slices within the active period have a "ready" status, the job can be executed for the output slice. The change in status for the output data slice happens on all the output data sets, and execution is the same as the first scenario.

Figure 5:
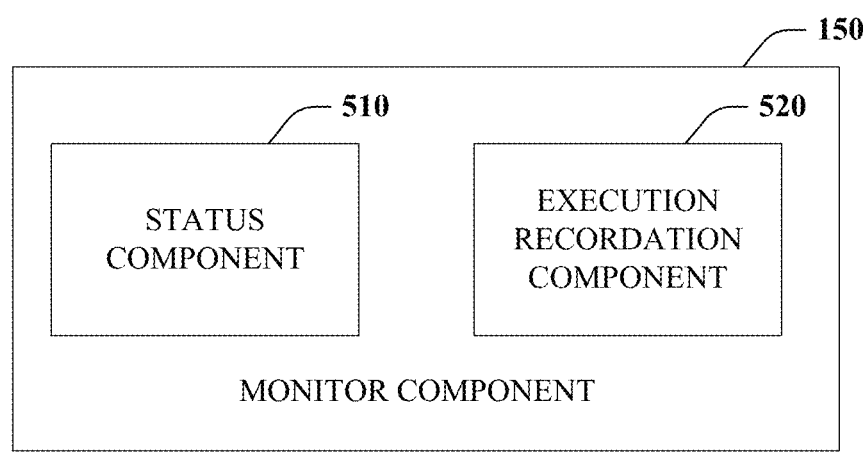
FIG. 5 is a block diagram of a representative monitor component.

FIG. 5 depicts a representative monitor component 150 in further detail. The monitor component 150 includes status component 510 and execution recordation component 520. The status component 510 monitors the status of jobs and/or the data they produce. For example, the status component can monitor whether output data was successfully generated by job execution or the job execution failed to successfully generate the output data. As noted previously, failure or successful execution can be presented to a user by way of a user interface. The status component 510 can also monitor additional status information including when data a job that produced the data is pending execution, in progress, or ready for consumption, among other things. The execution recordation component 520 is configured to acquire data regarding computer resource utilization during job execution. In one instance, the information can be requested and acquired from an operating system or the like control mechanism. Resource utilization can subsequently be utilized by a user interface to present a split view comprising a timeline and data utilization aligned with the timeline.

FIGS. 6-10 are exemplary screenshots illustrating various visualizations produced by the user interface component 110 regarding job scheduling and monitoring. These screenshots are intended to aid clarity and understanding with respect to aspects of this disclosure and are not intended to limit the claimed subject matter thereto. It is to be appreciated that the provided screenshots depict solely one implementation. Various other combinations and arrangements of graphical elements and text are contemplated and intended to fall within the scope of the appended claims. Furthermore, it is to be appreciated that various sounds can also be employed in conjunction with visualizations to aid user understanding with respect to job scheduling. By way of example, and not limitation, a sound can be played upon selection of a job or data, or upon detecting an execution failure.

Figure 6:
FIG. 6 is an exemplary screenshot of an interface for job driven scheduling and monitoring.

FIG. 6 is a screenshot of an interface 600 that can be produced by the user interface component 110. As shown, the interface 600 includes three panels, source panel 610, published panel 620, and schedule panel 630. The source panel 610 presents a plurality of available data sets and enables sources to be added or deleted therefrom. It should be appreciated that the data sets depicted in source panel 610 can be arbitrary data sources. For example, some data sets can be associated with on-premises data while other data sources are associated with network or cloud data stores. Furthermore, the data sets can be of substantially any structure or format. The published panel 620 provides visual representation of published or consumable data sources after desired transformations are performed.

The schedule panel 630 visualizes a schedule of job execution a well as monitored results of execution. More particularly, the schedule panel 630 presents a split view include a timeline view 640 displayed as a Gantt chart including start and stop execution times of jobs and a resource utilization view 650 comprising line graph depicting resource consumption aligned with job execution. Job scheduling is easy to determine based on the graphic. For example, here a first job, which performs a remove duplicate operation, is scheduled for execution daily, and a second job, which performs a conditional split, is scheduled for execution every other day. Note also line 660 represents the current time with respect to execution. Jobs before the line are jobs that have already been executed, and jobs over the line are scheduled for execution sometime in the future. To highlight this distinction, operations that are scheduled but have not yet executed are illustrated in gray or, in other words, the operations are grayed out. Once they are executed, the operation will no longer be grayed out. Further, color differences with respect to job runs can represent additional information. Here, for example, jobs that are colored black indicate failed execution. In accordance with one aspect, a user can select a job run colored black and reschedule execution of the job.

Figure 7:
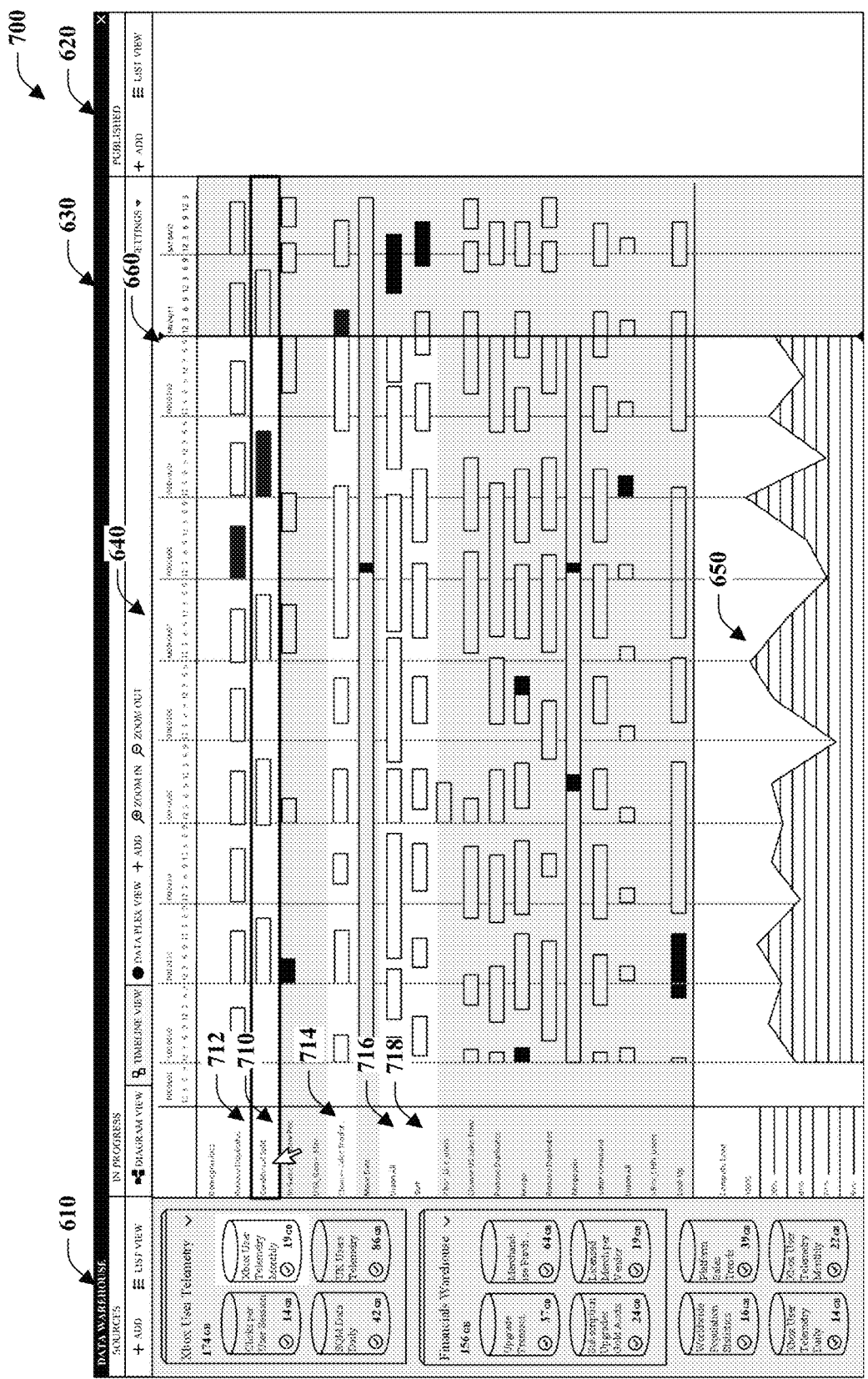
FIG. 7 is an exemplary screenshot of an interface that distinguishes related jobs.

FIG. 7 is a screenshot of an interface 700 that can be produced by the user interface component 110. Similar to interface 600 of FIG. 6, the interface 700 includes source panel 610, published panel 620, and schedule panel 630 including timeline view 640 and resource utilization view 650, as previously described. The interface 700, however, shows selection of a job and highlighting of jobs related to selection. Here, the second job 710, which performs a conditional split, is selected by a user for example by click, touch, or other gesture. After the job is selected, jobs related to the selected job are automatically identified and presented visually distinct from other jobs. In this example, the first job 712, which performs a remove duplicate operation, the fifth job 714, which performs cleansing of sales data, the seventh job 716, which performs a union, and the eight job 718, which performs a sort operation, are identified as related jobs and are highlighted with respect to other jobs. In particular, the selected job as well as related jobs presented with a white background while all other non-related jobs are grayed out. Related jobs include jobs that depend from the selected job and jobs from which the selected job depends. Here, the fifth job 714, seventh job 716, and eighth job 718 depend from the selected job, while the selected job depends on the first job 712. These dependencies can be identified based on the position of a job, wherein jobs that are presented after a selected job depend from the selected job while jobs that are positioned before the selected job are jobs from which the selected job depends.

Figure 8:
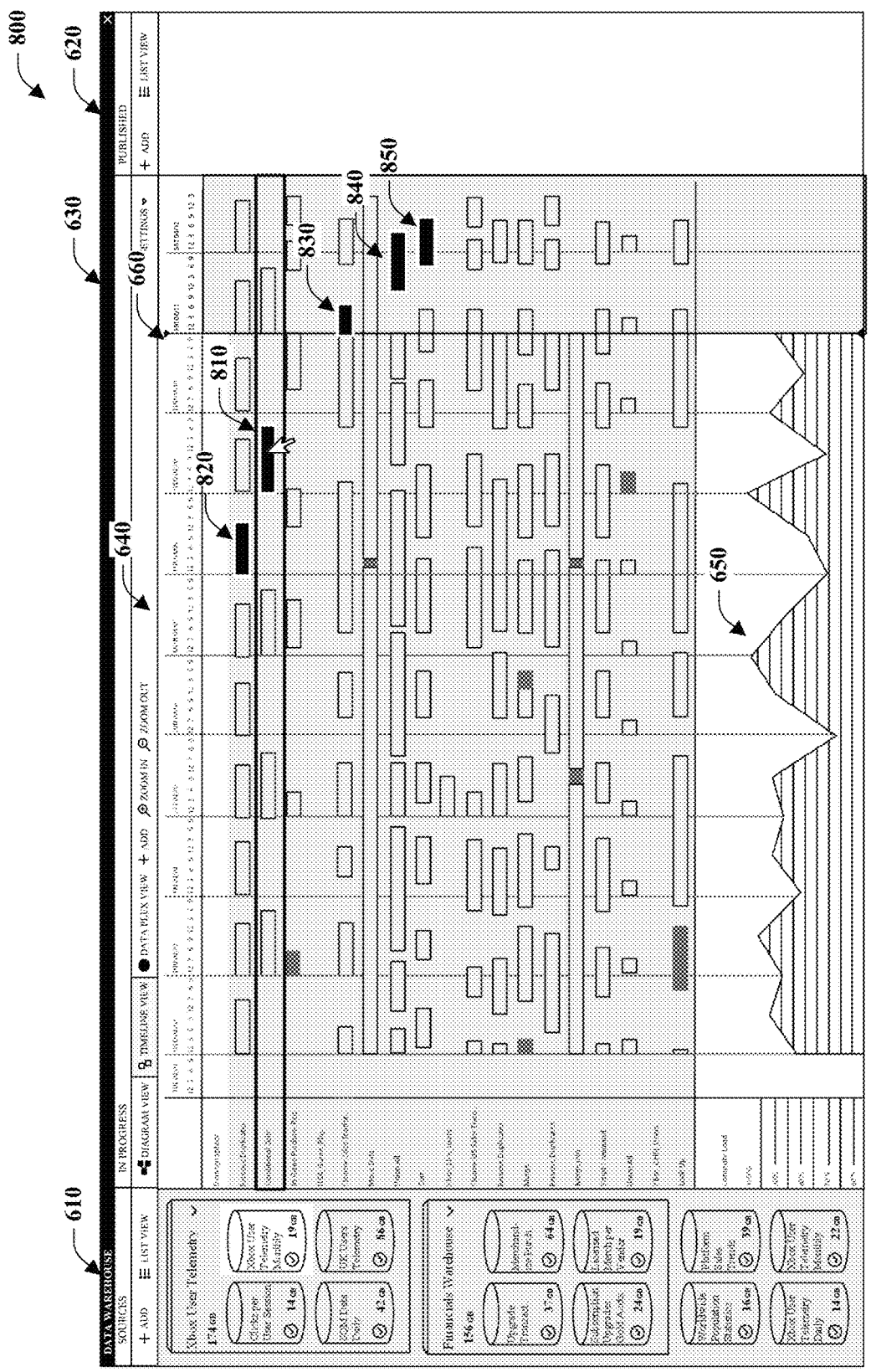
FIG. 8 is an exemplary screenshot of an interface that distinguishes related job failures.

FIG. 8 is a screenshot of an interface 800 that can be presented by the user interface component 110 in response to selection of a failed run of a job. Similar to screenshots of FIGS. 7 and 8, the interface 800 includes source panel 610, published panel 620, and schedule panel 630 including timeline view 640 and resource utilization view 650, as discussed previously. The interface 800 also indicates selection of a particular run of a job that has failed to execute successfully captured by the solid black color. Here, a run of a conditional split job is illustrated at 810. Selection of a failed job run triggers identifying other related failed-job runs that may have caused the selected job run to have failed or other job runs that may have failed, or are predicted to fail, based on failure of the selected job run. These related jobs can be identified based on recorded dependencies between jobs, execution status (e.g., failed, succeeded), and a schedule. Upon analysis of dependency, status, and schedule information a run of a remove duplicates job can be identified, as shown at 820, as the likely cause of the failure of the selected "conditional split" job run noted at 810. Further, a failure of a run of a "cleanse sales transformation" job, as illustrated at 830, can predicted as result of the failure of the "conditional split" job. Furthermore, failure of a run of a "union" job, as noted at 840, can be predicted based on the failure of one or both of the "conditional split" job and "cleanse sales transformation" job. Similarly, failure of a "sort" job, as shown at 850 can be predicted as a function of failure of the "conditional split" job, "cleanse data transformation" job, or "union" job. The interface 800 distinguishes the selected failed job run and related failed job runs from other job runs. In other words, the selected and related failed job runs are highlighted. Here, all job runs except the selected and related failed job runs are grayed out. Of course, the inverse could, different colors, different fonts, different sizes, among other things can be utilized for purposes of differentiation. This convenient mechanism helps users troubleshoot scheduling chains. In furtherance thereof, upon selection or other gesture with respect to one of the failed job runs a dialog search pane can be presented (not shown) which can enable searching of an execution logs, or log files, associated with job execution. In this manner, a user is able to transitions quickly from identification of a failure and the point of origin within a log file. Furthermore, a user can select or gesture with respect to a failed run and reschedule execution of the job. For example, a user could drag and drop a failed job run to another point in time to reschedule execution. As another example, a user can right click on the failed job run to bring up a dialog box that allows a user to reschedule the job.

Figure 9:
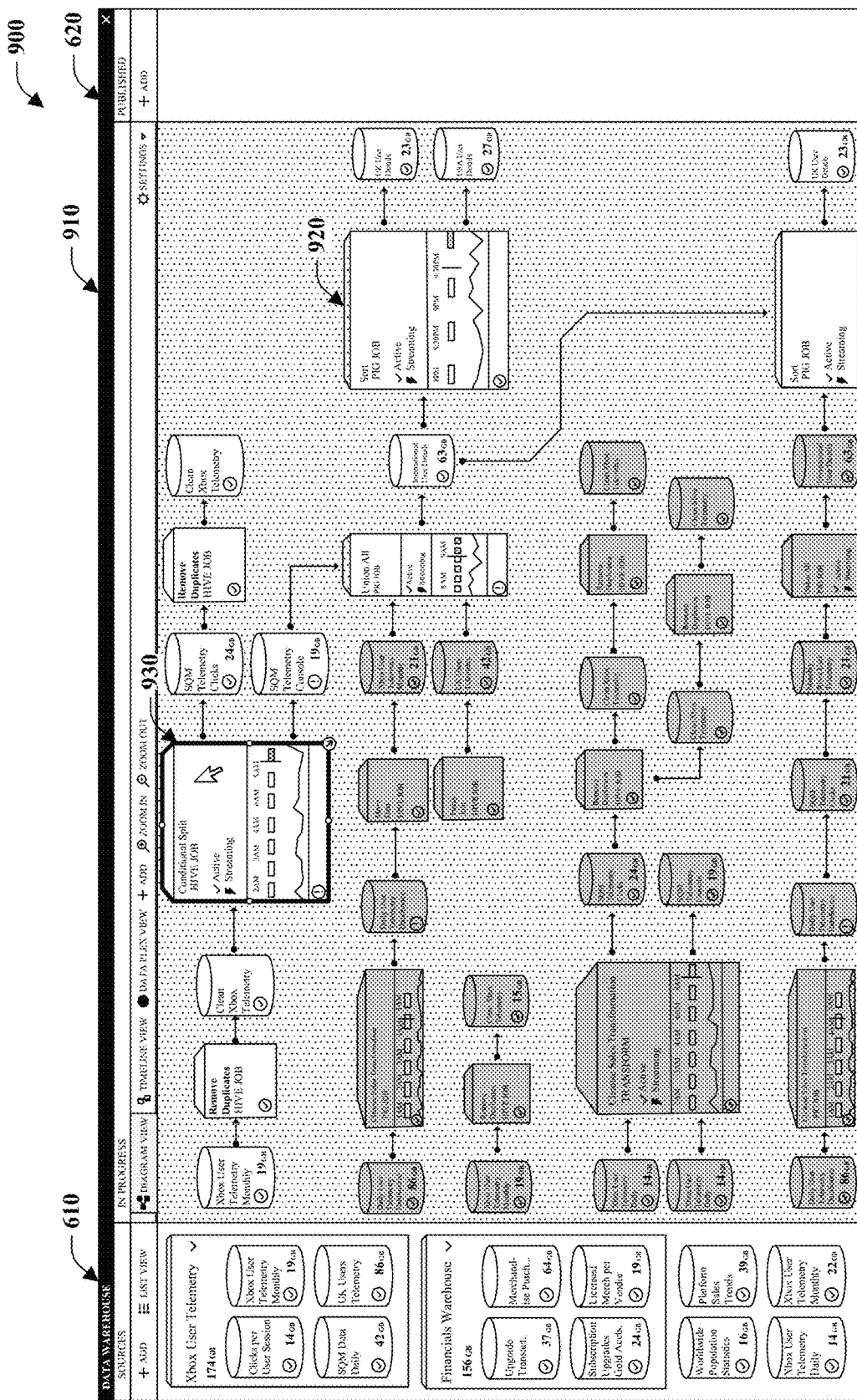
FIG. 9 is an exemplary screenshot of an interface that produces a diagram view and distinguishes related jobs and data.

FIG. 9 illustrates a screenshot of an interface 900 that can be produced by the user interface component 110. Similar to previous screenshots, the interface 900 includes the source panel 610, which presents a plurality of available data sets and enables sources to be added or deleted therefrom, and the published panel 620, that provides a visual representation of published or consumable data sets after desired transformations are performed. Moreover, the interface 900 includes a workspace panel 910. The workspace panel 910 enables visual authoring of jobs and pipeline by way of a diagram. For example, a user can acquire a data set by dragging and dropping a visual representation of the data set from the source panel 610. Next, the data set can be connected to a previously authored job (e.g., created automatically with data preview and/or manually coded), for example by drawing an arrow from the data set representation to a cube representation of a job to indicate the data set provides input that the job consumes and performs one or more data transformation operations (e.g., sort, group, pivot, split, filter . . . ) thereon. Additionally, a representation of the transformed output can be linked to a representation of a job on the workspace. As a result, a diagram is displayed of a job receiving input from a data source and outputting a new data source that reflects application of one or more transformation operations of the job. The interface 900 allows transition between this diagram view for job authoring and a timeline view for job scheduling and monitoring. Furthermore, scheduling and monitoring data can be presented within this diagram view in the workspace panel 910. As shown at 920, a representation of a "sort" job includes a split view including scheduling data and a graph of resource utilization. Furthermore, after receiving a signal selecting a job representation presented in the workspace panel 910, or previously with respect to a timeline, related jobs and data sets are determined and highlighted. Here, the screenshot depicts selection of a "conditional split" job at 930. After selection is received, dependency data collected regarding jobs and data can be utilized to identify jobs and data from which the selected job depends and jobs and data that depend from the selected job. In other words, job lineage including upstream and downstream jobs and data can be determined and subsequently displayed. Further, related data and jobs can be visually distinguished or highlighted with respect to other data and jobs. Here, related jobs and data are colored white while other data and jobs are colored gray or grayed out.

Figure 10:
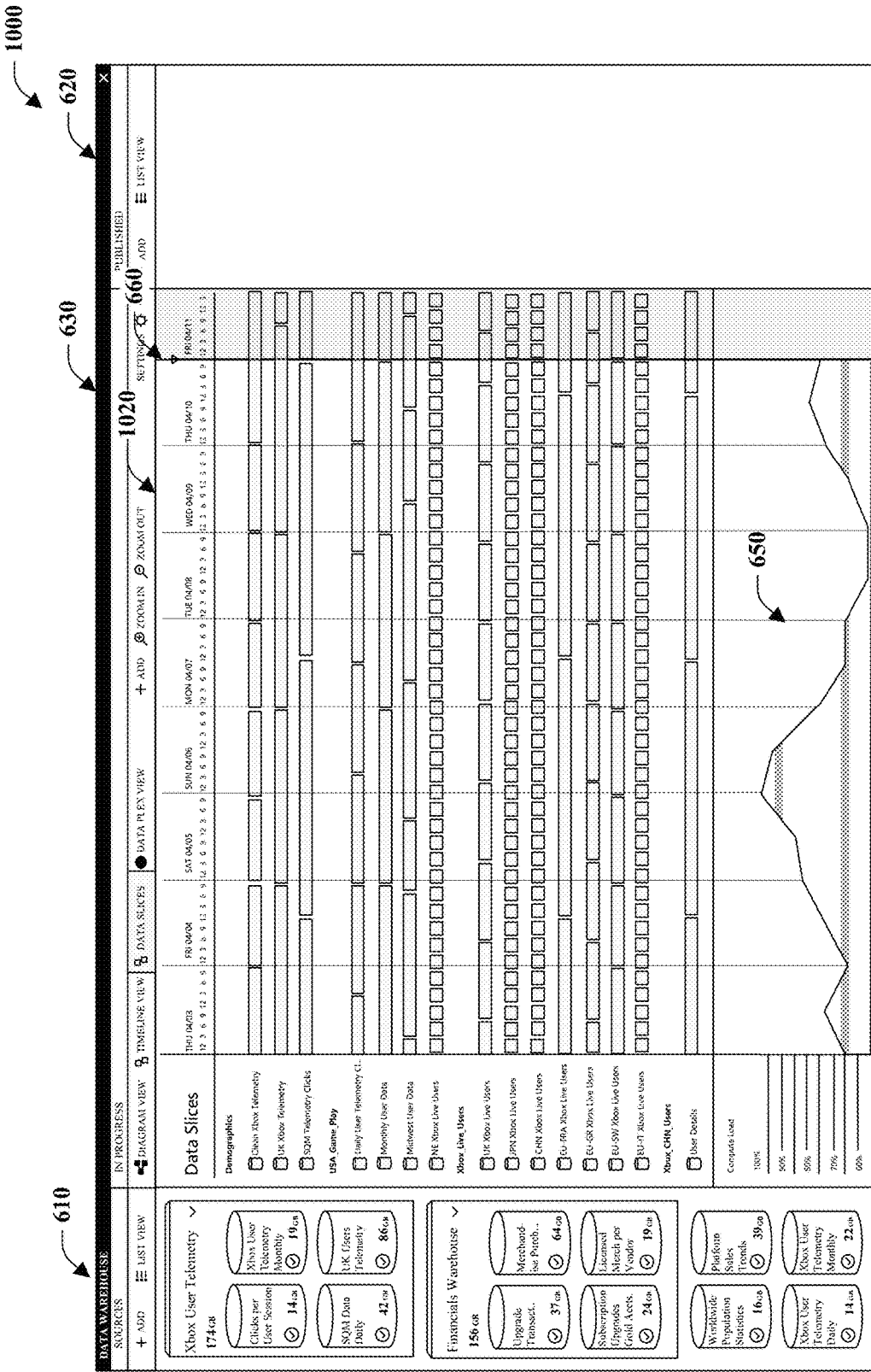
FIG. 10 is an exemplary screenshot of an interface for data driven scheduling and monitoring.

FIG. 10 depicts a screenshot of an interface 1000 that can be produced by the user interface component 110. Similar to interface 600 of FIG. 6, the interface 1000 includes the interface 1000 includes the source panel 610, which presents a plurality of available data sets and enables sources to be added or deleted therefrom, and the published panel 620, that provides a visual representation of published or consumable data sets after desired transformations are performed. The interface 1000 also includes the schedule panel 630 including a split view including a timeline view as well as a resource utilization view 650. Here, however, the timeline view 1020 is presented in terms of data slice time as opposed to processing time for job execution. In other words, the timeline view 1020 shows the time of data rather than time of processing. For example, consider a scenario in which hourly processing is to be performed over events. Processing starts by taking an hour worth of events followed by some transformation operations. More specifically, processing of the hour from 9 a.m. to 10 a.m. can begin at 10:15 a.m. Subsequently, some aggregations can be performed at 11 a.m., a merge might be performed with other data at 12 p.m., and results may be complete at 1 p.m. The timeline view 1020 thus provides a view of the time of data and how it is processed throughout a time period (e.g., day, week . . . ) as opposed to job execution time concerning how long jobs take to run. The schedule panel 630 also includes the line 660 that represents the current time with respect to data processing. Data before the line represents data that that has already been produced, and data after the line represent data scheduled for production sometime in the future. To highlight this distinction, data scheduled but have not yet produced are illustrated in gray or, in other words, the operations are grayed out. After data is produced, the data will no longer be grayed out. Further, color differences with respect to data can represent additional information. For example, data colored black indicates failed production of associated data. In accordance with one aspect, a user can select a data colored black and reschedule execution to produce the data. Although not illustrated, other information can also be conveyed by color or other visual feature with respect to data including data status such as "pending execution," "ready," "in progress," and "failed," among others.

Figure 11:
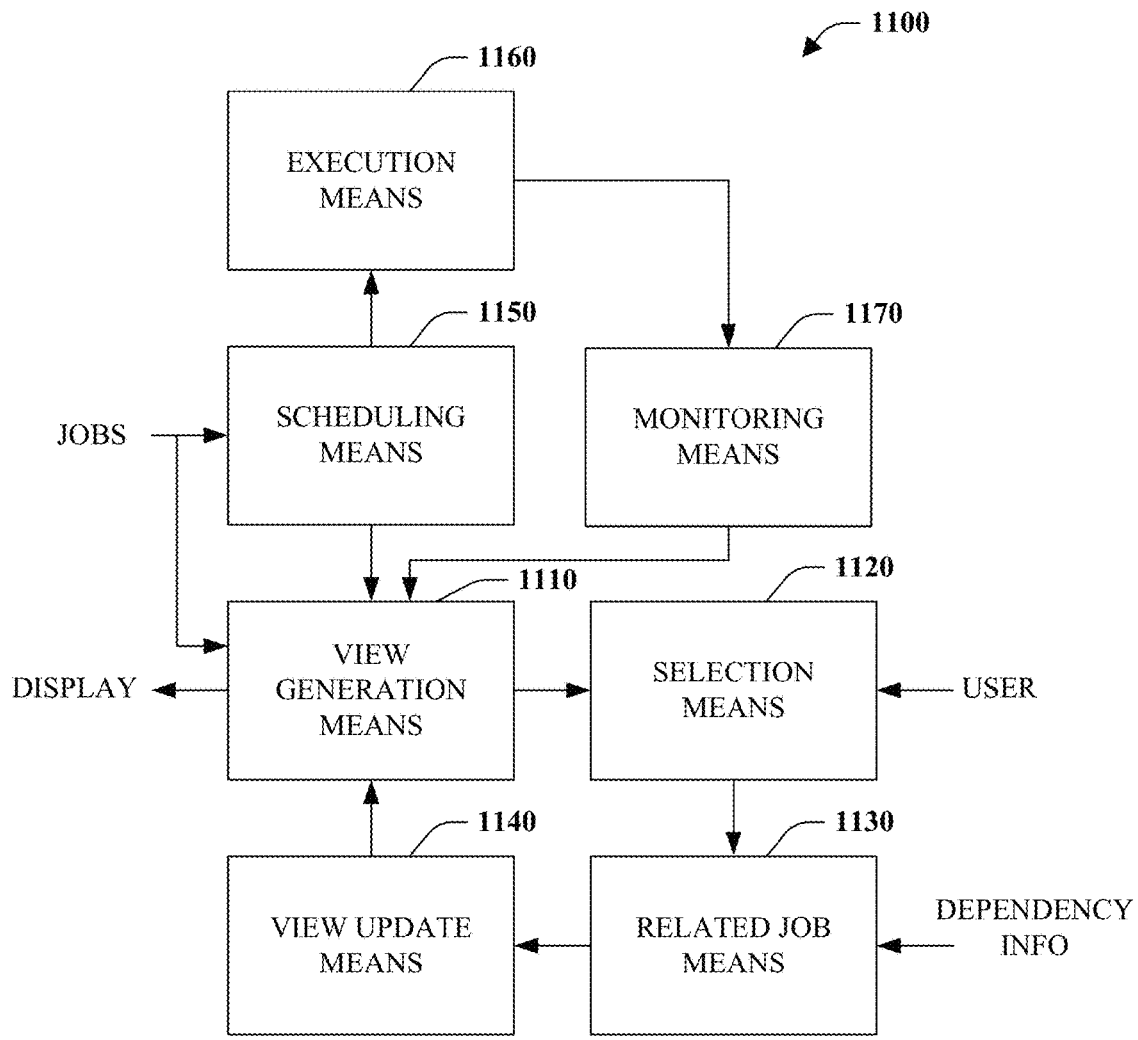
FIG. 11 is a block diagram of a job system.

FIG. 11 depicts a job system 1100. The system 1100 includes view generation means 1110 that receives input including data transformation jobs and provides a means for generating a view of the data transformation jobs. Hardware, software, or a combination of hardware and software can be employed in generation of a view, which is a visualization that includes or pertains to data transformation jobs. A view generated by the view generation means 1110 can be provided to a display for presentation. In one instance, the view generation means 1110 can be or form part of a graphical user interface. In accordance with one embodiment, the view generated can be a diagram of data transformation jobs or job pipeline comprising a set of one or more related jobs with output of a first job optionally providing input to second job.

Selection means 1120 is a mechanism produces a signal indicating selection of a job in the view. Hardware, software, or a combination of hardware and software can be utilized to implement the selection means 1120. A user can employ an input mechanism to select or otherwise identify a job and the selection means 1120 can receive the input and identify the selected job, for instance by comparing the location of user input to the position of jobs in a view. A variety of input mechanisms can be employed by a user including but not limited to a touch pad, a mouse, a touch screen, camera, or microphone.

Related job means 1130 provides a mechanism to identify jobs related to a selected job automatically. Given a selected job provided by the selection means 1120 the related job means can receive, retrieve, or otherwise obtain or acquire dependency information regarding jobs. Subsequently, the related job means can identify related jobs for example by looking up the selected job and identifying jobs that are related to the selected job, wherein related jobs are jobs that depend from the selected job or jobs on which the selected job depends. In accordance with one aspect, dependencies can be captured in terms of job data dependencies including input data on which the job depends and output data produced by the job. In one embodiment, the dependency data can be captured in a directed graph that includes jobs as vertices and data sets as directed edges connecting the jobs. To determine related jobs, the graph can be traversed forward and backward from a vertex that represents the selected job, wherein traversing forward (e.g., downstream from selected job) captures jobs and data sets that depend on the selected job and traversing backward (e.g., upstream from selected job) identifies jobs and data sets from which the selected job depends. The related job means 1130 can employ hardware, software, or a combination of hardware and software to identify related jobs (as well as data sets), for example as a computer executable software component or firmware.

View update means 1140 is a mechanism that allows changes to be made to a view. In one instance, the view update means comprises hardware, software, or a combination of hardware and software receive, retrieve or otherwise obtain or acquire the selected job, one or more related jobs and optionally related data sets directly from the related job means 1130 or indirectly from a location (e.g., memory, storage . . . ) and visually distinguish the selected job and related jobs and data sources from other jobs and data sources presented in the view. In other words, the view update means 1140 can highlight the selected job and related jobs and data sources in the view.

Scheduling means 1150 provides scheduling functionality with respect to job execution. Embodied as hardware, software, or a combination of hardware and software, the scheduling means 1150 can receive retrieve or otherwise obtain or acquire one or more jobs and generate a schedule for job execution in accordance with definition of the job or information associated therewith providing scheduling information. For example, if a job dictates daily execution, the job or job runs can be scheduled every day. Likewise, a job or job run can be scheduled for every other day if the job specifies execution every other day. Of course, a schedule can also account for various data dependencies such that a job is scheduled to execute after its input data is available.

The scheduling means 1150 can make the schedule available to the view generation means. Accordingly, the view generation means can generate a view of the schedule as a timeline of scheduled jobs. In this instance, the selection means 1120 can enable selection of a job from a timeline view of a schedule. Subsequently, the related job means can determine jobs related to the selected job and the view update means 1140 can update the timeline view of the schedule to highlight the selected job and related jobs.

Execution means 1160 execute jobs provided or otherwise made available by the scheduling means 1150. The execution means 1160 can employ hardware, software, or a combination of hardware and software to execute a data transformation job over one or more input data sets and produce one or more output data sets that reflect application of a data transformation operation specified by the job. The execution means 1160 can read input data from a first designated location and subsequently write output data to a second designated location, wherein the locations can be memory or storage device locations.

Monitoring means 1170 is a mechanism comprising hardware, software, or a combination of hardware and software that monitors execution of jobs by the execution means 1160. In accordance with one embodiment, the monitoring means 1170 can detect or otherwise determine whether a job executed successfully or failed to execute successfully. This can be accomplished by monitoring output of the execution means 1160 including potential messages regarding success of failure of execution. In one instance, the monitoring means 1170 can determine whether execution of job was initiated as scheduled and whether or not output of the job was produced with respect to concluding execution was successful or unsuccessful. In another embodiment, the monitoring means 1170 can monitor resource utilization with respect to job execution. In one instance, the monitoring means 1170 can be implemented with mechanism to directly monitor resource including processor, memory, storage, and network utilization. Alternatively, the monitoring means 1170 can request and receive such information from an operation system or other system or component that monitors resource utilization.

The monitoring means 1170 can make acquired data or information available to the view generation means 1110 for use in generating a view. In one instance, the view generation means 1110 can generate timeline view of a schedule that indicates whether a scheduled job run succeed or failed based on information provided by the monitoring means 1170. In this case, the selection means 1120 can provide a mechanism to signal selection of a failed execution run. Subsequently, the related job means 1130 identifies related job runs and can more specifically related job runs that failed, or can be predicted to fail based on dependency on a failed job run. In accordance with one embodiment, in addition to data dependency information the related job means can receive operation information including, among other things, whether a job executed successfully or failed to execute successfully. In one instance, the operational information can be stored together with dependency information. Alternatively, operational information can be stored and accessed separately. The view update means 1140 can subsequently highlight the selected failed job run as well as related job runs, which failed, or are predicted to fail. Additionally, the view generation means 1110 can include produce a visualization of resource utilization information provided by the monitoring means 1170 aligned with the job runs. For example, the view generation means 1110 generate a graph such as a line graph that represents resource utilization.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the scheduler component 130 and user interface 110 can employ such mechanisms to determine or infer job schedules and data presentation, respectively, based on previous interactions and other context information.

In view of the exemplary systems described above, methodologies that may be implemented in accordance with the disclosed subject matter will be better appreciated with reference to the flow charts of FIGS. 12-17. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 12:
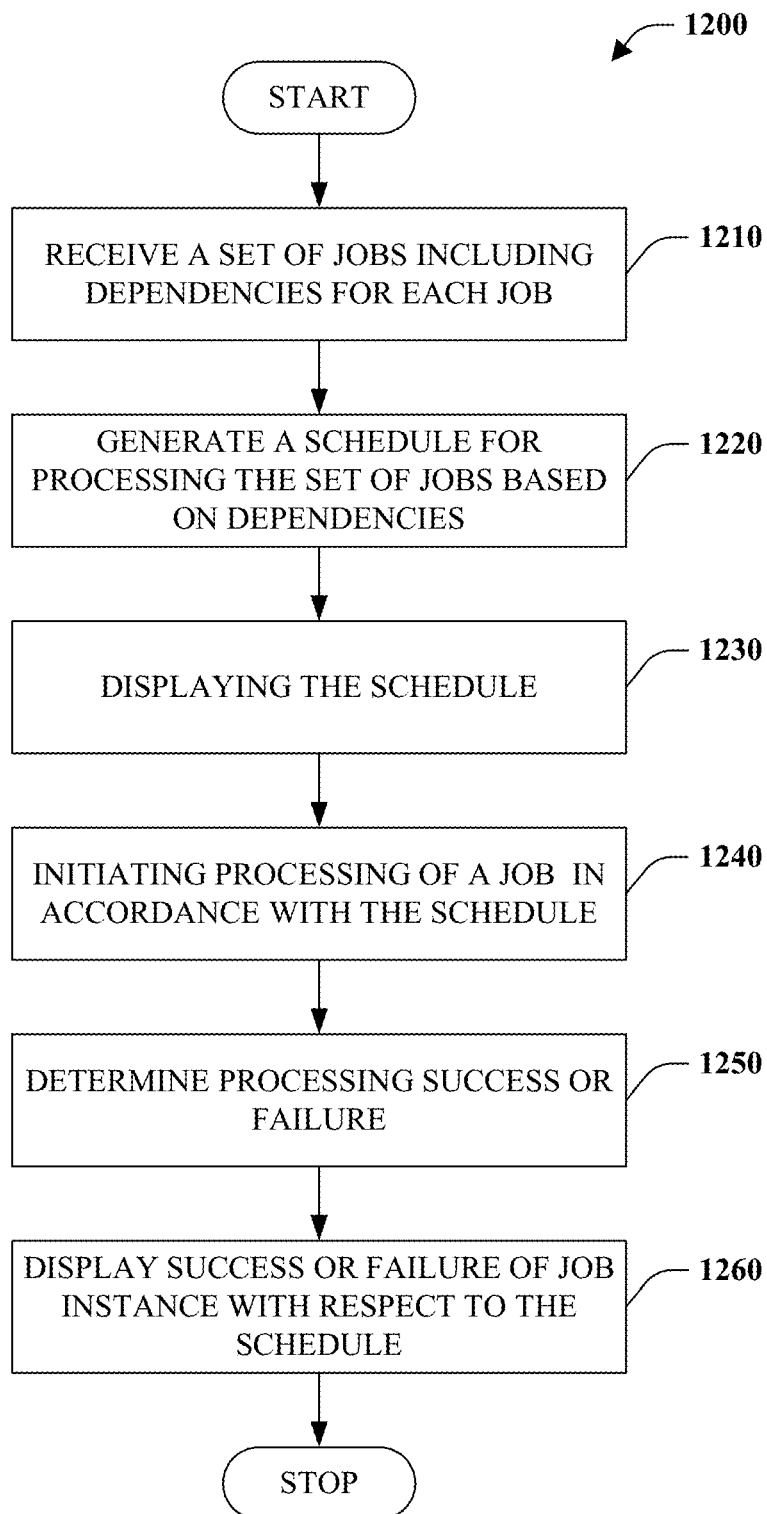
FIG. 12 is a flow chart diagram of a method of scheduling and monitoring jobs.

Referring to FIG. 12, a method 1200 of job scheduling and monitoring is illustrated. At reference numeral 1210, a set of jobs is received including dependencies for each job comprising at least identification of data on which the job depends and data produced by the job. In other words, a set of jobs is received including data dependencies specified with respect to each job. At numeral 1220, a schedule is generated for processing the set of jobs based on the dependencies and other information regarding execution time and frequency defined by each job. At reference 1230, the generated schedule is displayed. In accordance with one aspect, the schedule can be present in a Gantt chart including start and stop execution times of jobs or data produced by the jobs. At numeral 1240, processing of a job or execution of a job run can be initiated in accordance with the schedule. For example, a job can be provided to an execution component for processing. At 1250, process success of failure is determined with respect to job for which execution was initiated. Such a determination can be made by merely accepting notification from an execution component regarding execution status or retrieving the execution status from a location such as memory or disk. At reference numeral 1260, success or failure of a job run is displayed with respect to the schedule. For example, a successfully executed job run can be colored green and a failure of a job run can be colored red to provide a clear indication regarding the success or failure of a job run. Furthermore, jobs can be predicted to succeed or fail based on their dependencies and colored accordingly.

Figure 13:
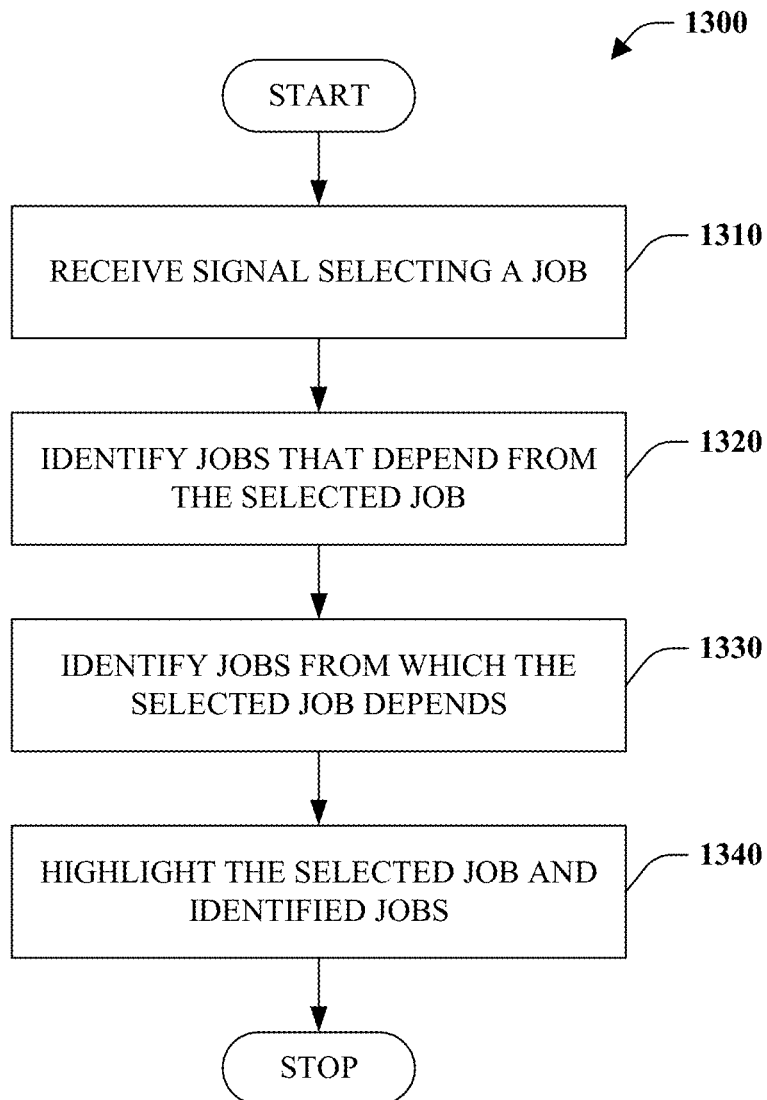
FIG. 13 is a flow chart diagram of a method of distinguishing related jobs.

FIG. 13 depicts a method 1300 of distinguishing related jobs. At reference numeral 1310, a signal is received selecting a job comprising one or more job runs from a schedule. For instance, a job such as "remove duplicates" can be selected from a timeline view illustrating one or more jobs and job runs scheduled for execution, for example by left clicking on or touching a job. At numeral 1320, jobs that depend from the selected job are identified. At numeral 1330, jobs from which the selected job depends are identified. Identification of jobs can be based on analysis of dependencies. In accordance with one embodiment, dependencies can be captured as a directed graph of jobs as vertices and data sets as directed edges connecting the jobs. In this instance, the selected job can be identified within this graph, and analysis can proceed forward from the selected job to identify jobs that depend from the selected job and backward to identify jobs from which the selected job depends. At reference numeral 1340, the selected job and identified jobs are highlighted. In other words, on a schedule, for example, the selected job and identified jobs are visually distinguished from other jobs displayed. In this manner, a user can quickly understand relationships between jobs.

Figure 14:
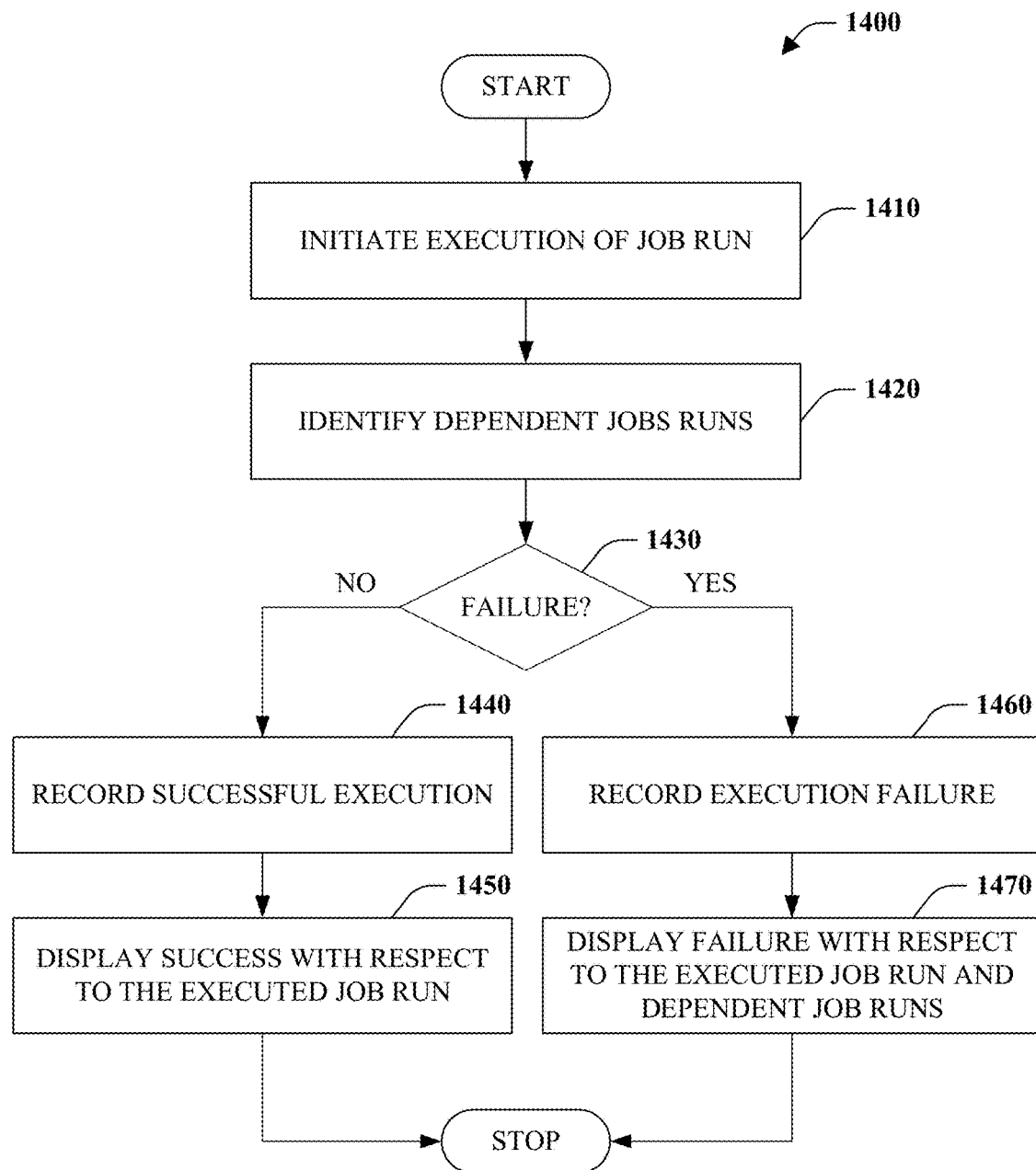
FIG. 14 is a flow chart diagram of a method of distinguishing successful and failed job execution.

FIG. 14 illustrates a method 1400 of distinguishing successful and failed job execution. At reference numeral 1410, execution of a job run is initiated. Here, a job run is an instance of a job, which is scheduled to run a particular time. At reference numeral 1420, job runs that are dependent on execution of the job run for which execution is initiated are identified. Dependency information can be utilized to identify dependent job runs. For example, dependency information can be recorded in a directed graph of jobs as vertices and data sets connected as directed edges connecting the jobs. The job for which execution is initiated can be identified in the graph and dependent jobs can be identified by traversing the graph down from the job. Subsequently, scheduled runs of the dependent jobs can be determined from the schedule or from the graph if scheduled runs are recorded for each job. At numeral 1430, a determination is made has to whether there was a failure with respect to execution of the job run. If there was not a failure ("NO"), the method proceeds to 1440 where successful execution is recorded for the job run. In accordance with one aspect, operational dependency information is recorded which includes job status in addition to dependency information. Successful execution is a job status that can be saved in this regard. Next, at 1450, successful execution is displayed with respect to the executed job and optionally for dependent jobs as a prediction of successful execution. For example, the job run displayed on a schedule can be colored green. If, at 1430, execution failure was determined ("YES"), the method continues at 1460 where execution failure is recorded. Failure is a job status that can be saved with respect to preserving operational dependency information as noted above. The method then proceeds to 1470 where display of the failure with respect to the executed job is indicated, for example on a schedule. Furthermore, jobs that depend on the executed job are also likely to fail if the executed job fails. Accordingly, dependent job runs can be displayed in a manner that indicates failure is predicted. For instance, the executed job run and dependent job runs can be colored red to indicate failure and predicted failure, respectively.

Figure 15:
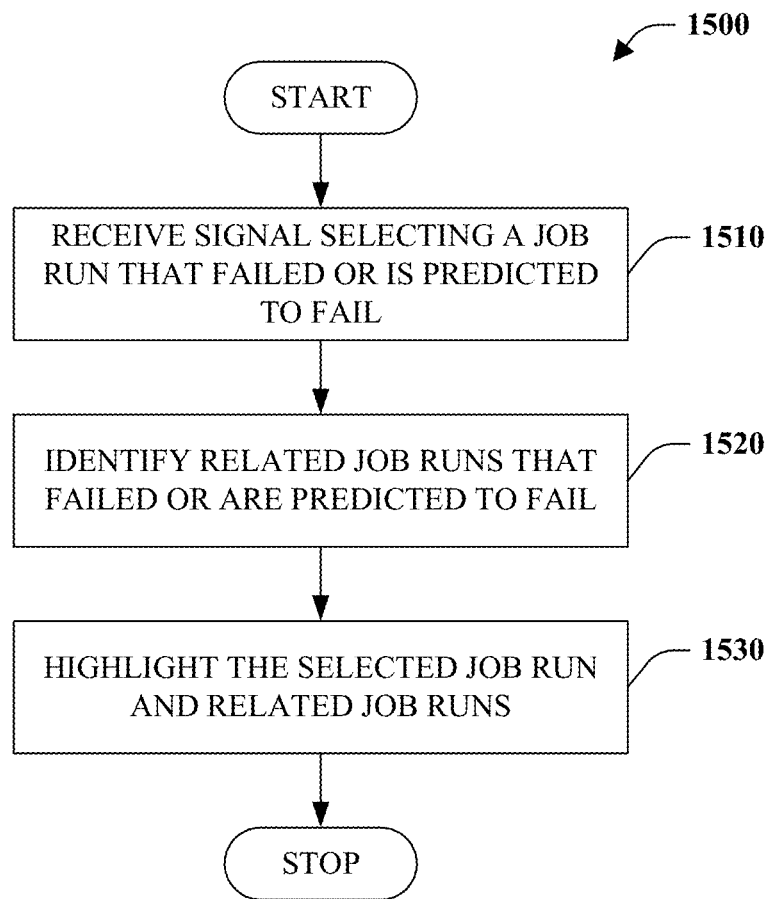
FIG. 15 is a flow chart diagram of a method of facilitating troubleshooting scheduling chains.

FIG. 15 illustrates a method 1500 that facilitates troubleshooting a scheduling chain. At reference numeral 1510, receive a signal selecting a job run that failed or is predicted to fail, or, more specifically, where failure is indicated with respect to a schedule, for instance. For example, a schedule can include a plurality of jobs, and for each job, a job run is scheduled for execution at some time. Moreover, for each job run a visual indication can be provided that notes that a job run succeeded or failed, if previously executed, or is predicted to succeed or fail, if not yet executed. The selection signal can be associated with one of the job runs that indicates a failure, and generated upon a user clicking or touching a visual representation of the job run, for example. At numeral 1520, related job runs that failed, or are predicted to fail are identified. Related job runs include job runs that depend on a selected job run and job runs on which the selected job run depends. Related jobs can be identified by analyzing dependency information regarding jobs. By way of example, a selected job can be identified in a directed graph comprising jobs as vertices and data sets connected as directed edges connecting the jobs. Subsequently, the graph can be traversed upstream from the selected job and downstream from the selected job to identify related jobs. In accordance with one embodiment, the job runs and status can be recorded in conjunction with dependency information. Accordingly, upon identification of related jobs, job runs can be identified and those including a failure status either actual or predicted can be identified. Of course, some information including job runs can be saved with respect to a schedule and utilized to determine related jobs runs. At numeral 1530, the selected job run and the related job runs are highlighted. Stated differently, the selected and related job runs can be visually distinguished from other job runs. This can allow a user to focus on failure and cascading failures for troubleshooting.

Figure 16:
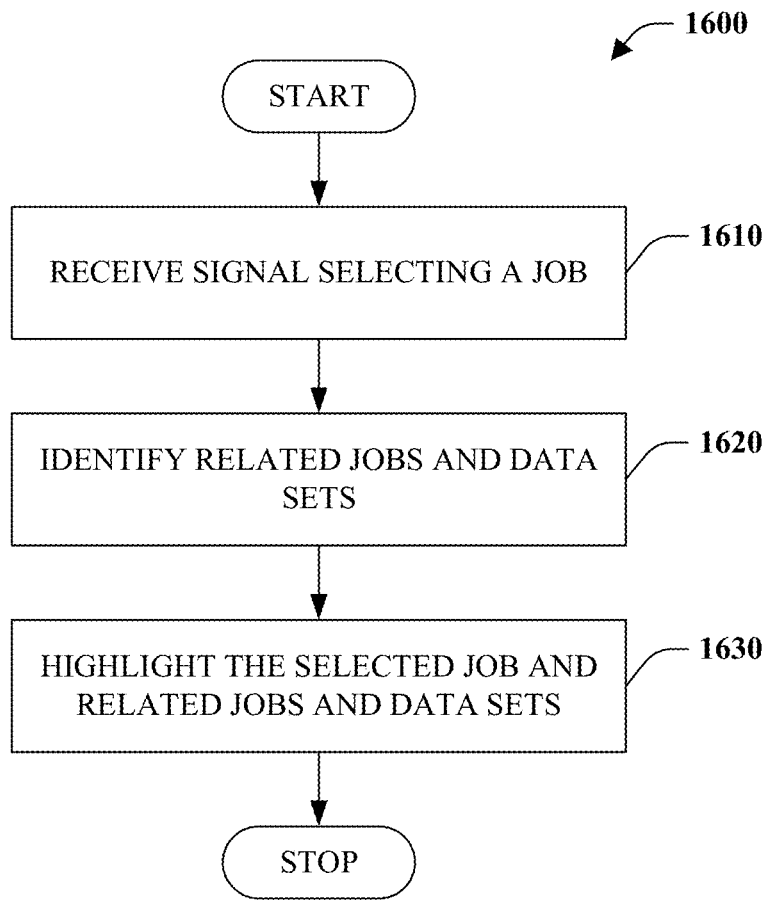
FIG. 16 is a flow chart diagram of distinguishing related jobs and data sets.

FIG. 16 is a flow chart diagram of a method 1600 of distinguishing related jobs and data sets. At reference numeral 1610, a signal is received that selects a job (or a data set). For example, a signal can be received upon a user selecting a job by way of one or more predetermined gestures in a schedule view or in a diagrammatic view of jobs and data sets. At numeral 1620, related jobs and data sets are identified. In accordance with embodiment, dependency information regarding jobs and data sets can be saved and consulted to identify related jobs and data sets including jobs and data sets that depend from the selected job and jobs (e.g., downstream) and data sets from which the selected job depends (e.g. upstream). In one instance, directed graph can include jobs as vertices and data sets as directed edges connecting jobs. The selected job (or data set) can be identified in the graph and the graph traversed to identify jobs and data sets that depend from the selected job and from which the selected job (or data set) depends. At numeral 1630, the selected job (or data set) and related jobs and data sets are highlighted on a visual display. In other words, the selected and related jobs and data sets are visually distinguished from other jobs and data sets. For example, in a diagrammatic view of specified jobs and data sets a subset of related jobs and data sets can be visually distinguished. This is especially helpful in understanding relations in the presence of a large number of jobs and data sets and complex pipelines or chains.

Figure 17:
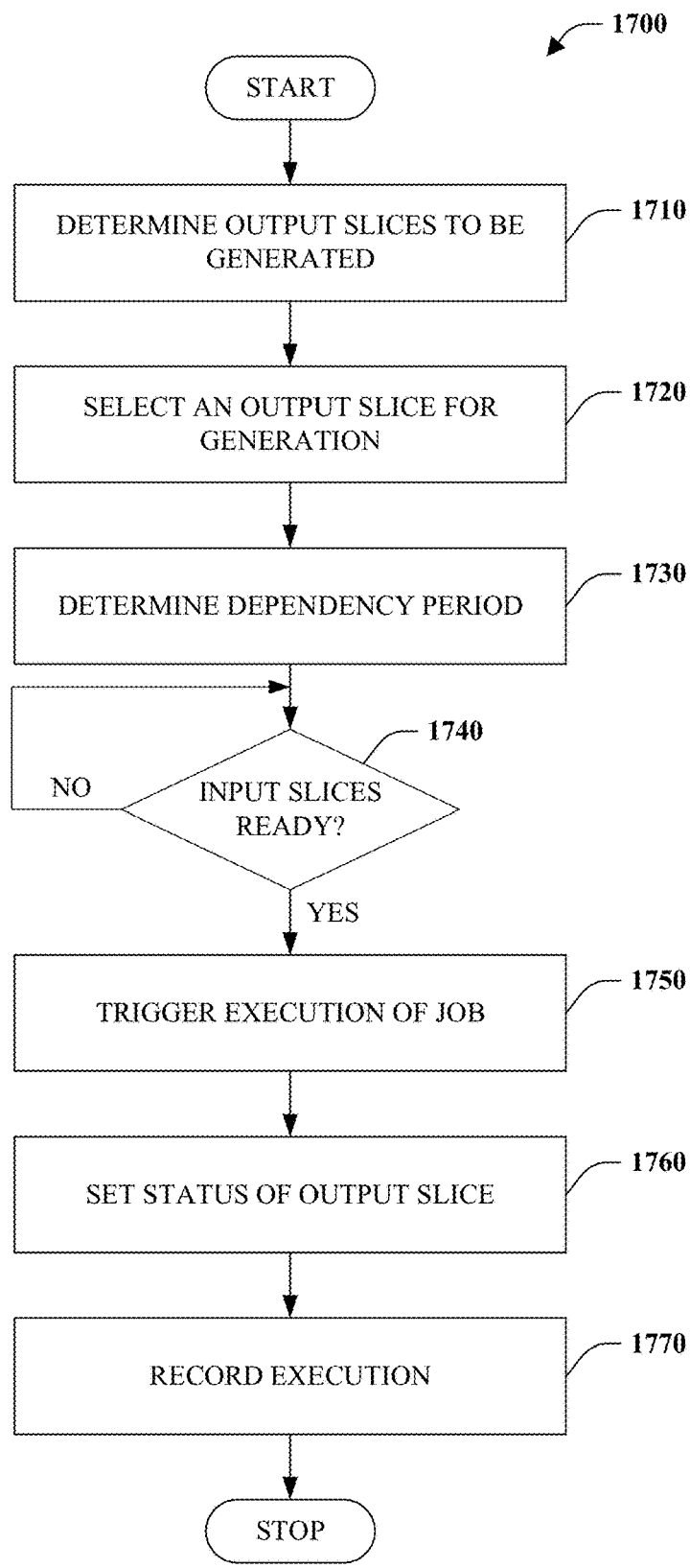
FIG. 17 is a flow chart diagram of a method of data driven processing of jobs.

FIG. 17 depicts a method 1700 of data driven processing of jobs. At reference numeral 1710, output data slices to be generated are determined, wherein data slices are pieces of data in a data set sliced by a time period with which they are associated. In one particular implementation, the output data slices can be identified by analyzing the status of data slices. If the status is "pending execution" or the like, the data slice can be determined to be an output data slice to be generated. At reference 1720, an output data slice is selected for generation. Here, selection from amongst a plurality of output data slices to be generated can be policy based. For example, a policy for job execution can specify selecting an output data slice for generation that is oldest first or newest first based on when the status was set to "pending execution" or the like. At reference numeral 1730, a dependency period is determined. A dependency period is the time range of input data required to generate an output data slice. This can be determined for a select output data slice based on dependency information defined with respect to a job that generates the output data slice. For example, a job can be specified to operate over three hours of a data from a first source and one hour of data from a second source. Accordingly, if all data sets have an hourly schedule (e.g., slice is one hour) three hours of data from the first source and on hour of data from the second source is required to generate an hour of output slice data. At numeral 1740, a determination is made whether all required input data slices in the dependency period are ready. This can be determined by querying for the status of input data slice. If each of the input data slices has a status of "ready," meaning data is ready for consumption, the method can proceed to numeral 1750. Otherwise, the method can continue to loop and wait for input data slices to become ready. At numeral 1750, execution of the job that produces the selected output slice is triggered or initiated. At reference 1760, the status of the output slice can be set. While the data is being produced, the status can be set to "in progress" signifying the data slice is being produced for a job. Once execution is complete (or failed to be performed), the status can change to "failed" if an attempt to generate the output slice failed, or "ready" if the attempt to generate succeeded and the data slice is ready for consumption. At reference numeral 1770, information regarding the execution is recorded. For example, the status of the output slice can be recorded as well as the start and end time of execution. Such data can be utilized with respect to generating information and visualizations for presentation to a user to facilitate understanding and control of job execution.

The subject disclosure supports various products and processes that perform, or are configured to perform, various actions regarding job scheduling and monitoring. What follows are one or more exemplary methods and systems.

A method comprises presenting on a display in an interface a view of one or more data transformation jobs; receiving a first signal from a user selecting a job from the one or more data transformation jobs by way of the interface; determining one or more related jobs to the selected job automatically based on data dependencies between jobs; and presenting the selected job and the one or more related jobs visually distinct from one or more other jobs. The method further comprises presenting one or more jobs scheduled for execution on the display in the interface. The method further comprises presenting one or more previously executed jobs on the display in the interface. The method further comprises presenting previously executed jobs visually distinct from scheduled jobs on the display in the interface. The method further comprises determining compute load during execution of the one or more jobs; and presenting on the display in the interface the compute load aligned with the one or more jobs. The method further comprises presenting on the display in the interface an indication that at least one job failed to execute successfully. The method further comprises receiving a second signal selecting one of at least one job run that failed to execute successfully; determining automatically one or more related job runs related to a selected job run that failed to execute successfully or are predicted to fail based on dependency on a job run that failed to execute successfully; and highlighting the selected job run and the one or more related job runs on the display in the interface. The method further comprises receiving a second signal selecting one of the at least one job that failed to execute successfully; and rescheduling execution of the at least one job in response to the second signal. The method further comprises presenting the selected job and the one or more related jobs in a diagram comprising representations of jobs and data sets as well as connections between the jobs and data sets.

A method comprises employing at least one processor configured to execute computer-executable instructions stored in a memory to perform the following acts: detecting selection of a data transformation job by way of a graphical user interface; and determining one or more related jobs automatically based on data dependencies between jobs in response to detecting the selection of the job; and presenting a selected job and the one or more related jobs visually distinct from other jobs displayed on the graphical user interface. The method further comprises monitoring computer resource utilization in conjunction with job execution; and presenting a visualization of the resource utilization aligned with one or more respective jobs. The method further comprises determining success or failure of execution of job runs; and presenting failed execution runs different from successful execution runs. The method further comprises rescheduling execution of a job run based on a signal received with respect to the job run that failed to execute successfully. The method further comprises highlighting a select failed job run and one or more related failed job runs or runs predicted to fail based on dependency on a failed job run after receipt of a signal identifying the select failed job run. The method further comprises presenting the selected job and the one or more related jobs in a diagram comprising representations of jobs and data sets and connections between the jobs and data sets.

A system comprises a processor coupled to a memory, the processor configured to execute the following computer-executable components stored in the memory: a first component configured to schedule a data transformation job for execution based requirements specified by the job; a second component configured to present the job on a timeline diagram in accordance with the schedule; and a third component configured to highlight one or more jobs related to a select job based on data dependency in response to a signal that identifies the select job on the timeline diagram. The third component is further configured to highlight the one or more jobs that depend from the select job. The third component is further configured to highlight the one or more jobs from which the select job depends. The system further comprises a fourth component configured to detect if job execution is successful or unsuccessful. The system further comprises a fifth component configured to highlight related unsuccessful job execution or predicted unsuccessful job execution based on dependency on an unsuccessful job execution in response to selection of a representation of unsuccessful job execution on the timeline.

A system comprises means for generating a view of a set of data transformation jobs; means for receiving a selection of a job, a selected job, from the set of data transformation jobs; means for determining automatically one or more related jobs to the selected job based on dependency information; and means for highlighting the selected job and the one or more related jobs in the view. The system further comprises means for generating a schedule for execution of the set of data transformation jobs. The means for generating the view generates a view of the schedule. The system further comprises means for executing one of the set of data transformation jobs in accordance with the schedule. The system further comprises means for detecting success or failure of a run of the one of the set of data transformation jobs. The means for generating the view generates a view of the schedule including identification of job run success or failure. The means for receiving the selection receives selection of a failed job run and the means for highlighting highlights one or more related job runs that failed or are predicted to fail based on dependency on a failed run.

Aspects of the disclosure are directed toward data transformation, or, in other words, placing data in a useable form for subsequent publication or consumption by analysis tools. More particularly, aspects are directed toward the technical problem of scheduling and monitoring data transformation jobs. Technical means employed to address this problem include determining jobs related to a user-selected job, including jobs that depend from the selected job and/or jobs from which the selected job depends, based on job dependencies. Selection of a job as well as highlighting a selected job and determined related jobs are implemented in conjunction with a graphical user interface, which aids a user in understanding relationships between jobs and troubleshooting. As a result, technical effects include, but are not limited to, improved user efficiency with respect to job scheduling and error reduction.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 18:
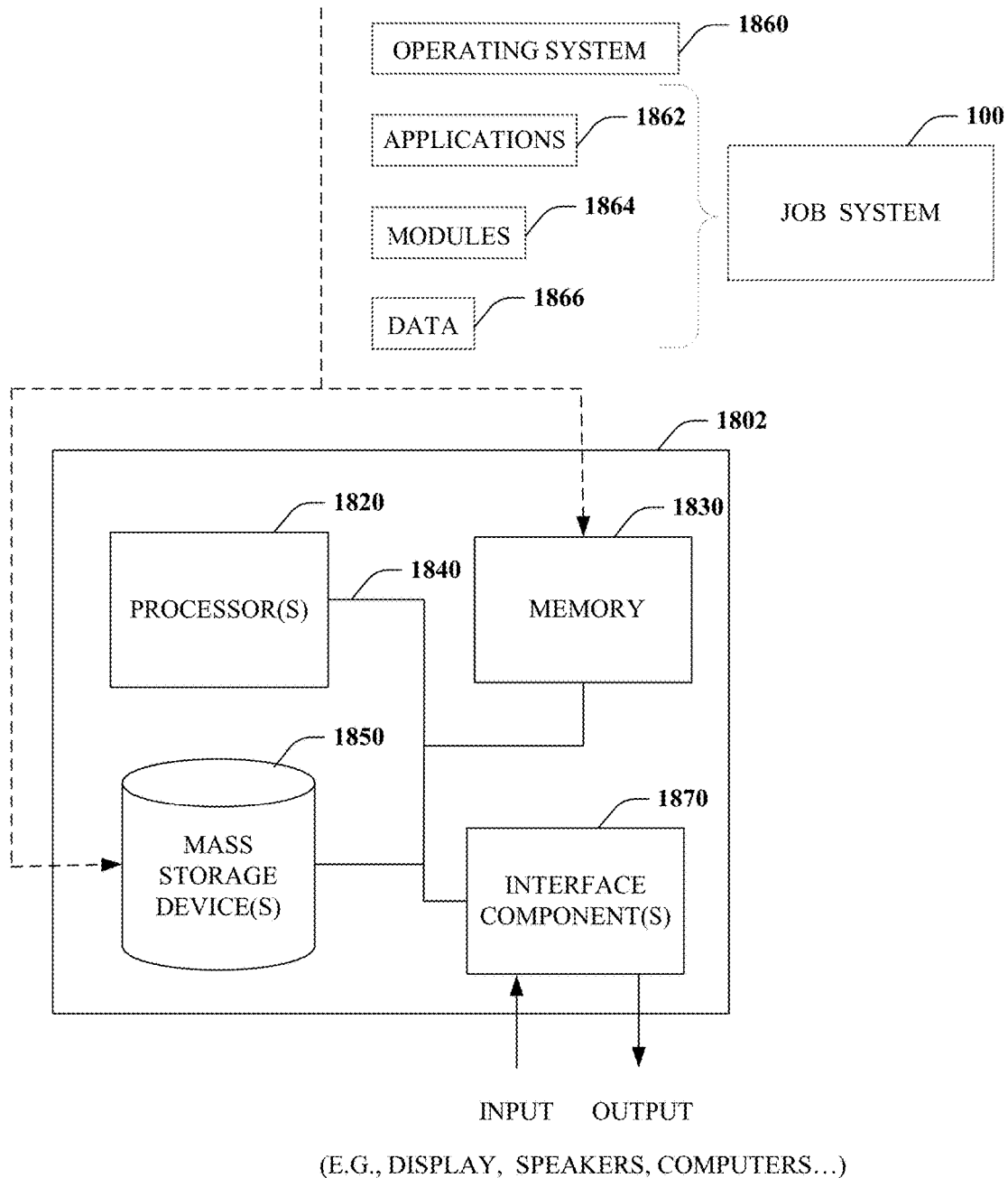
FIG. 18 is a schematic block diagram illustrating a suitable operating environment for aspects of the subject disclosure.

In order to provide a context for the claimed subject matter, FIG. 18 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory devices.

With reference to FIG. 18, illustrated is an example general-purpose computer or computing device 1802 (e.g., desktop, laptop, tablet, watch, server, hand-held, programmable consumer or industrial electronics, set-top box, game system, compute node . . . ). The computer 1802 includes one or more processor(s) 1820, memory 1830, system bus 1840, mass storage device(s) 1850, and one or more interface components 1870. The system bus 1840 communicatively couples at least the above system constituents. However, it is to be appreciated that in its simplest form the computer 1802 can include one or more processors 1820 coupled to memory 1830 that execute various computer executable actions, instructions, and or components stored in memory 1830.

The processor(s) 1820 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1820 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) can be a graphics processor.

The computer 1802 can include or otherwise interact with a variety of computer-readable media to facilitate control of the computer 1802 to implement one or more aspects of the claimed subject matter. The computer-readable media can be any available media that can be accessed by the computer 1802 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EE-PROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computer 1802. Accordingly, computer storage media excludes modulated data signals and that which comprises communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1830 and mass storage device(s) 1850 are examples of computer-readable storage media. Depending on the exact configuration and type of computing device, memory 1830 may be volatile (e.g., RAM), non-volatile (e.g., ROM, flash memory . . . ) or some combination of the two. By way of example, the basic input/output system (BIOS), including basic routines to transfer information between elements within the computer 1802, such as during start-up, can be stored in nonvolatile memory, while volatile memory can act as external cache memory to facilitate processing by the processor(s) 1820, among other things.

Mass storage device(s) 1850 includes removable/non-removable, volatile/non-volatile computer storage media for storage of large amounts of data relative to the memory 1830. For example, mass storage device(s) 1850 includes, but is not limited to, one or more devices such as a magnetic or optical disk drive, floppy disk drive, flash memory, solid-state drive, or memory stick.

Memory 1830 and mass storage device(s) 1850 can include, or have stored therein, operating system 1860, one or more applications 1862, one or more program modules 1864, and data 1866. The operating system 1860 acts to control and allocate resources of the computer 1802. Applications 1862 include one or both of system and application software and can exploit management of resources by the operating system 1860 through program modules 1864 and data 1866 stored in memory 1830 and/or mass storage device (s) 1850 to perform one or more actions. Accordingly, applications 1862 can turn a general-purpose computer 1802 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, job system 100 or portions thereof, can be, or form part, of an application 1862, and include one or more modules 1864 and data 1866 stored in memory and/or mass storage device(s) 1850 whose functionality can be realized when executed by one or more processor(s) 1820.

In accordance with one particular embodiment, the processor(s) 1820 can correspond to a system on a chip (SOC) or like architecture including, or in other words integrating, both hardware and software on a single integrated circuit substrate. Here, the processor(s) 1820 can include one or more processors as well as memory at least similar to processor(s) 1820 and memory 1830, among other things.

Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the job system 100 and/or associated functionality can be embedded within hardware in a SOC architecture.

The computer 1802 also includes one or more interface components 1870 that are communicatively coupled to the system bus 1840 and facilitate interaction with the computer 1802. By way of example, the interface component 1870 can be a port (e.g. serial, parallel, PCMCIA, USB, FireWire . . . ) or an interface card (e.g., sound, video . . . ) or the like. In one example implementation, the interface component 1870 can be embodied as a user input/output interface to enable a user to enter commands and information into the computer 1802, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 1870 can be embodied as an output peripheral interface to supply output to displays (e.g., LCD, LED, plasma . . . ), speakers, printers, and/or other computers, among other things. Still further yet, the interface component 1870 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method performed by a system comprising at least one processor coupled to a memory storing machine-executable instructions, which, when executed by the processor, control the system to perform acts comprising:
    conveying, for display on a display device, a timeline view of a data-transformation job schedule in terms of one or more data slices comprising pieces of data of a continuum comprising a data set, wherein each data slice is generated or consumed by a data-transformation job and includes a length, and start and end times;
    receiving a first signal from a user selecting a data slice from the one or more data slices in the view;
    determining one or more related data slices to the user selected data slice automatically based on data dependencies, wherein the one or more related data slices comprise at least one of one or more data slices that depend from the user selected data slice or one or more data slices from which the user selected data slice depends; and
    conveying, for display on the display device, a visualization of the user selected data slice and the one or more related data slices visually distinct from one or more other data slices in the timeline view.

2. The method of claim 1, wherein the acts further comprise conveying, for display on the display device, one or more data slices scheduled for generation by a job.

3. The method of claim 1, wherein the acts further comprise conveying, for display on the display device, one or more data slices previously generated by a job.

4. The method of claim 1, wherein the acts further comprise conveying, for display on the display device, previously generated data slices visually distinct from data slices scheduled for generation by a job.

5. The method of claim 1, wherein the acts further comprise:
    determining compute load during generation of one or more data slices; and
    conveying, for display on the display device, the compute load aligned with the one or more data slices.

6. The method of claim 1, wherein the acts further comprise conveying, for display on the display device, an indication that at least one data sliced failed to generate successfully.

7. The method of claim 6, wherein the acts further comprise:
    receiving a second signal selecting one of at least one data slice that failed to generate successfully;
    determining automatically one or more related data slices related to a selected data slice, wherein the related data slices include at least one of one or more data slices from which the selected data slice depends that failed to generate successfully or one or more data slices predicted to fail to generate successfully based on dependency from the selected data slice; and
    conveying, for display on the display device, a highlighted version of the selected data slice and the one or more related data slices.

8. The method of claim 6, wherein the acts further comprise:
    receiving a second signal selecting one of the at least one data slice that failed to generate successfully; and
    rescheduling generation of the at least one data slice in response to the second signal.

9. The method of claim 1, wherein the acts further comprise conveying, for display on the display device, the selected data slice and the one or more related data slices in a job authoring diagram comprising representations of jobs and data sets as well as connections between the jobs and data sets.

10. A computer system, comprising:
    a processor coupled to a memory, the processor configured to execute machine-executable instructions stored in the memory that when executed perform acts comprising:
    conveying, for display on a display device, a timeline view of a data-transformation job schedule in terms of one or more data slices comprising pieces of data of a continuum comprising a data set, wherein each data slice is generated or consumed by a data-transformation job and includes a length, and start and end times;
    detecting a first signal from a user selecting a data slice from the one or more data slices in the view;
    determining one or more related data slices to the user selected data slice automatically based on data dependencies, wherein the one or more related data slices comprise at least one of one or more data slices that depend from the user selected data slice or one or more data slices from which the user selected data slice depends; and
    conveying, for display on the display device, a visualization of the user selected data slice and the one or more related data slices visually distinct from one or more other data slices in the view.

11. The system of claim 10, wherein the acts further comprise:

monitoring computer resource utilization in conjunction with data slice production; and conveying, for display on the display device, a visualization of the resource utilization aligned with one or more respective data slices.

12. The system of claim 10, wherein the acts further comprise:

determining success or failure of data slice generation; and presenting failed data slice generation different from successful data slice generation.

13. The system of claim 10, wherein the acts further comprise rescheduling generation of a data slice based on a signal received with respect to a failed data slice generation.

14. The system of claim 10, wherein the acts further comprise:

detecting a second signal selecting one of at least one data slice where generation failed;

determining automatically one or more related data slices that are related to a selected data slice and predicted to fail based on dependency on the selected data slice; and conveying, for display on the display device, a highlighted version of the selected data slice and the one or more related data slices.

15. The system of claim 10, wherein the acts further comprise conveying, for display on the display device, the selected data slice and the one or more related data slices in a job authoring diagram comprising representations of jobs and data sets as well as connections between the jobs and data sets.

16. A computer-readable storage medium having instructions stored thereon that enable at least one processor to perform a method upon execution of the instructions, the method comprising:

conveying, for display on a display device, a timeline view of a data-transformation job schedule in terms of one or more data slices comprising pieces of data of a continuum comprising a data set, wherein each data slice is generated or consumed by a data-transformation job and includes a length, and start and end times;

receiving a first signal from a user selecting a data slice from the one or more data slices in the view;

determining one or more related data slices to the user selected data slice automatically based on data dependencies, wherein the one or more related data slices comprise at least one of one or more data slices that depend from the user selected data slice or one or more data slices from which the user selected data slice depends; and conveying, for display on the display device, a visualization of the user selected data slice and the one or more related data slices visually distinct from one or more other data slices in the view.

17. The computer-readable storage medium of claim 16, wherein the method further comprises conveying, for display on the display device, previously produced data slices visually distinct from data slices scheduled for generation.

18. The computer-readable storage medium of claim 16, wherein the method further comprises:

determining compute load during production of one or more data slices; and conveying, for display on the display device, the compute load aligned with the one or more data slices.

19. The computer-readable storage medium of claim 16, wherein the method further comprises conveying, for display on the display device, an indication that at least one data sliced failed to generate successfully.

20. The computer-readable storage medium of claim 16, wherein the method further comprises:

detecting a second signal selecting one of at least one data slice that failed to generate successfully;

determining automatically one or more related data slices related to a selected data slice, wherein the related data slices include at least one of one or more data slices from which the selected data slice depends that failed to generate successfully or one more data slices predicted to fail to generate successfully based on dependency from the selected data slice; and conveying, for display on the display device, a highlighted version of the selected data slice and the one or more related data slices.

* * * * *